US009934301B2

(12) United States Patent
Srivastava et al.

(10) Patent No.: US 9,934,301 B2
(45) Date of Patent: *Apr. 3, 2018

(54) METHODS AND SYSTEMS FOR FILE REPLICATION UTILIZING DIFFERENCES BETWEEN VERSIONS OF FILES

(71) Applicant: ORACLE INTERNATIONAL CORPORATION, Redwood Shores, CA (US)

(72) Inventors: Piyush Kumar Srivastava, Bangalore (IN); Madhusudhana Honnuduke Srinivasa Murthy, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 890 days.

This patent is subject to a terminal disclaimer.

(21) Appl. No.: 13/633,526

(22) Filed: Oct. 2, 2012

(65) Prior Publication Data

US 2013/0124472 A1 May 16, 2013

Related U.S. Application Data

(60) Division of application No. 12/951,561, filed on Nov. 22, 2010, now Pat. No. 8,306,954, which is a
(Continued)

(51) Int. Cl.
*G06F 17/30* (2006.01)

(52) U.S. Cl.
CPC .. *G06F 17/30575* (2013.01); *G06F 17/30215* (2013.01); *Y10S 707/99945* (2013.01); *Y10S 707/99953* (2013.01)

(58) Field of Classification Search
None
See application file for complete search history.

(56) References Cited

U.S. PATENT DOCUMENTS

| 4,441,205 A | 4/1984 | Berkin et al. |
| 5,392,424 A * | 2/1995 | Cook ............... G05B 19/058 |
| | | 714/49 |

(Continued)

OTHER PUBLICATIONS

U.S. Appl. No. 13/633,509, Non-Final Office Action dated Oct. 24, 2014, 14 pages.
(Continued)

*Primary Examiner* — Amresh Singh
(74) *Attorney, Agent, or Firm* — Kilpatrick Townsend & Stockton LLP

(57) ABSTRACT

Methods and systems for efficient file replication are provided. In some embodiments, one or more coarse signatures for blocks in a base file are compared with those coarse signatures for blocks of a revised file, until a match is found. A fine signature is then generated for the matching block, of the revised file and compared to a fine signature of the base file. Thus, fine signatures are not computed unless a coarse signature match has been found, thereby minimizing unneeded time-consuming fine signature calculations. Methods are also provided for determining whether to initiate a delta file generation algorithm, or whether to utilize a more efficient replication method, based upon system and/or file parameters. In accordance with additional embodiments, the lengths of valid data on physical blocks are obtained from physical block mappings for the files, and these lengths and mappings are utilized for delta file generation, to minimize unnecessary signature computations.

19 Claims, 8 Drawing Sheets

Related U.S. Application Data continuation of application No. 11/891,962, filed on Aug. 14, 2007, now Pat. No. 7,844,580, which is a continuation of application No. 10/402,603, filed on Mar. 28, 2003, now Pat. No. 7,320,009.

(56) References Cited

U.S. PATENT DOCUMENTS

| | | | |
|---|---|---|---|
| 5,436,653 A | 7/1995 | Ellis et al. | |
| 5,479,654 A * | 12/1995 | Squibb | 707/695 |
| 5,504,518 A | 4/1996 | Ellis et al. | |
| 5,572,246 A | 11/1996 | Ellis et al. | |
| 5,574,906 A | 11/1996 | Morris | |
| 5,612,729 A | 3/1997 | Ellis et al. | |
| 5,621,454 A | 4/1997 | Ellis et al. | |
| 5,634,052 A | 5/1997 | Morris | |
| 5,659,539 A | 8/1997 | Porter et al. | |
| 5,778,395 A | 7/1998 | Whiting et al. | |
| 5,864,682 A | 1/1999 | Porter et al. | |
| 5,870,554 A | 2/1999 | Grossman et al. | |
| 5,870,754 A | 2/1999 | Dimitrova et al. | |
| 5,898,836 A | 4/1999 | Freivald et al. | |
| 5,919,247 A | 7/1999 | Van Hoff et al. | |
| 5,958,051 A | 9/1999 | Renaud et al. | |
| 6,012,063 A | 1/2000 | Bodnar | |
| 6,021,491 A | 2/2000 | Renaud | |
| 6,052,531 A | 4/2000 | Wadin, Jr. et al. | |
| 6,075,470 A | 6/2000 | Little et al. | |
| 6,101,507 A | 8/2000 | Cane et al. | |
| 6,233,589 B1 | 5/2001 | Balcha et al. | |
| 6,366,930 B1 | 4/2002 | Parker et al. | |
| 6,374,250 B2 | 4/2002 | Ajtai et al. | |
| 6,377,957 B1 | 4/2002 | Jeyaraman | |
| 6,434,238 B1 | 8/2002 | Chaum et al. | |
| 6,513,050 B1 | 1/2003 | Williams et al. | |
| 6,529,527 B1 | 3/2003 | Chen et al. | |
| 6,567,117 B1 | 5/2003 | Nago et al. | |
| 6,574,212 B1 | 6/2003 | Jurgensen et al. | |
| 6,611,213 B1 | 8/2003 | Bentley et al. | |
| 6,621,942 B1 | 9/2003 | Hacker et al. | |
| 6,697,873 B1 | 2/2004 | Yik et al. | |
| 6,718,314 B2 | 4/2004 | Chaum et al. | |
| 6,751,363 B1 | 6/2004 | Natsev | |
| 6,772,196 B1 | 8/2004 | Kirsch et al. | |
| 6,775,548 B1 | 8/2004 | Rong et al. | |
| 6,816,872 B1 | 11/2004 | Squibb | |
| 6,850,508 B1 | 2/2005 | Chang et al. | |
| 6,888,893 B2 | 5/2005 | Li et al. | |
| 6,934,723 B2 | 8/2005 | Breiter et al. | |
| 6,973,465 B2 | 12/2005 | Kuzmin | |
| 6,987,752 B1 | 1/2006 | Sarraf et al. | |
| 7,068,718 B2 | 7/2006 | Kim et al. | |
| 7,107,419 B1 * | 9/2006 | Ghemawat | G06F 17/30067 707/999.202 |
| 7,170,938 B1 | 1/2007 | Cote et al. | |
| 7,289,643 B2 | 1/2007 | Brunk et al. | |
| 7,177,658 B2 | 2/2007 | Willenegger et al. | |
| 7,320,009 B1 | 1/2008 | Srivastava et al. | |
| 7,844,580 B2 | 11/2010 | Srivastava et al. | |
| 8,306,954 B2 | 11/2012 | Srivastava et al. | |
| 9,547,703 B2 | 1/2017 | Srivastava et al. | |
| 2002/0010702 A1 | 1/2002 | Ajtai et al. | |
| 2002/0126872 A1 | 9/2002 | Brunk et al. | |
| 2002/0159641 A1 | 10/2002 | Whitney et al. | |
| 2002/0169740 A1 | 11/2002 | Korn | |
| 2003/0159136 A1 | 8/2003 | Huang et al. | |
| 2003/0188160 A1 | 10/2003 | Sunder et al. | |
| 2003/0204531 A1 | 10/2003 | Kuzmin | |
| 2003/0212712 A1 * | 11/2003 | Gu et al. | 707/200 |
| 2004/0098427 A1 | 5/2004 | Peng | |
| 2005/0055382 A1 | 3/2005 | Ferrat et al. | |
| 2007/0288533 A1 | 12/2007 | Srivastava et al. | |
| 2011/0066594 A1 | 3/2011 | Srivastava et al. | |
| 2013/0031056 A1 | 1/2013 | Srivastava et al. | |

OTHER PUBLICATIONS

ICS 161: Design and Analysis of Algorithms Lecture Notes for Feb. 29, 1996; "Longest Common Sequences," World D Wide Web publication.

Chang, S., et al.; "A Robust Content Based Digital Signature for Image Authentication," Image D Processing, Sep. 1996, International Conference on Proceedings, val. 3, 4 pgs.

Hughes, J.F., et al.; "Novell's Guide to Netware 4.1 Networks,"© 1996, 67 pgs.

Lu, C., et al.; "Structural Digital Signature for Image Authentication: An Incidental Distortion Resistant Scheme," IEEE Transactions on Multimedia, vol. 5, No. 2, Jun. 2003, 13 pgs.

"Longest Common Subsequence Problem," Pruhs, World Wide Web publication, Oct. 6, 1997, 68 pages.

U.S. Appl. No. 10/402,603, filed Mar. 28, 2003, Notice of Allowance dated Jul. 17, 2007, 11 pages.

U.S. Appl. No. 10/402,603, filed Mar. 28, 2003, Office Action dated Nov. 28, 2006, 22 pages.

U.S. Appl. No. 10/402,603, filed Mar. 28, 2003, Final Office Action dated May 4, 2006, 22 pages.

U.S. Appl. No. 10/402,603, filed Mar. 28, 2003, Office Action dated Nov. 3, 2005, 12 pages.

U.S. Appl. No. 11/891,962, filed Aug. 14, 2007, Notice of Allowance dated Oct. 6, 2010, 10 pages.

U.S. Appl. No. 11/891,962, filed Aug. 14, 2007, Requirement for Restriction/Election dated Aug. 30, 2010, 5 pages.

U.S. Appl. No. 11/891,962, filed Aug. 14, 2007, Final Office Action dated Jan. 19, 2010, 12 pages.

U.S. Appl. No. 11/891,962, filed Aug. 14, 2007, Office Action dated Aug. 13, 2009, 12 pages.

U.S. Appl. No. 12/951,561, filed Nov. 22, 2010, Notice of Allowance dated Jul. 3, 2012, 5 pages.

U.S. Appl. No. 12/951,561, filed Nov. 22, 2010, Non-Final Rejection dated Jun. 7, 2011, 9 pages.

U.S. Appl. No. 12/951,561, filed Nov. 22, 2010, Final Rejection dated Dec. 1, 2011, 11 pages.

Final Office Action dated Jul. 31, 2015 for U.S. Appl. No. 13/633,509, filed Oct. 2, 2012, 11 pages.

Advisory Action dated Nov. 6, 2015 for U.S. Appl. No. 13/633,509, filed Oct. 2, 2012, 3 pages.

Executive Summary, World Wide Web publication, 5 pages.

Longest Common Subsequence, World Wide Web publication, 2 pages.

U.S. Appl. No. 13/633,509, Notice of Allowance dated Sep. 12, 2016, 8 pages.

* cited by examiner

METHODS AND SYSTEMS FOR FILE REPLICATION UTILIZING DIFFERENCES BETWEEN VERSIONS OF FILES

CROSS-REFERENCES TO RELATED APPLICATIONS

This application claims priority and benefit as a divisional application which claims the benefit of U.S. patent application Ser. No. 12/951,561, filed Nov. 22, 2010, which is a continuation application of U.S. patent application Ser. No. 11,891,692, entitled "Methods and Systems for File Replication Utilizing Differences Between Versions of Files," filed on Aug. 14, 2007, which is itself a continuation of U.S. patent application Ser. No. 10/402,603, now U.S. Pat. No. 7,320,009, entitled "Methods and Systems for file Replication Utilizing Differences Between Versions of Files," filed on Mar. 28, 2003.

TECHNICAL FIELD

The present invention relates generally to replication of data files, such as for backup or synchronization purposes, and in particular, relates to methods and systems for replicating files using differences between versions of files.

BACKGROUND

In computing systems and networks, data files are frequently replicated on multiple computers and storage devices, for various purposes. For example, for a given file in a primary storage device, it is often desirable to create a backup of the file and to store the backup file in a separate secondary storage device. The original copy of the file can then be easily recovered in the event the primary storage device becomes inoperable, or if the original copy becomes corrupt or deleted. Accordingly, even in the event of failure, important data can be recovered without significant file reconstruction efforts. Various storage management utilities and services can be utilized for such backup procedures.

In computer networks, replication of files and data can also take place for the purposes of synchronization. A synchronized file is one that exists in two different locations, such as on two different servers for example. By maintaining multiple synchronized copies at multiple locations, not only are alternative copies available in the event of a failure or loss of data, but system efficiency can also be improved. For example, each individual user of the network can access the closest replica of the data, thereby providing quicker access to the data and reducing network traffic.

However, while providing significant advantages, replication of files for such backup or synchronization purposes can require significant bandwidth. Moreover, copying a file from one location to another can require significant processing time and storage space. Accordingly, incremental replication procedures have been utilized where only those files that have been changed since the last backup are replicated. By replicating only the modified files and not the unmodified files, the replication process becomes more efficient.

While incremental replication of modified files can reduce network bandwidth as compared to complete replication of all files, such procedures can still suffer from inefficiency. This is especially the case when only small portions of files have been actually modified, but a copy of the entire modified file is transmitted during the incremental replication. Accordingly, it can be desirable to utilize replication procedures which include differencing mechanisms which identify the differences between the backup (base) version of the original file and the revised version of the original file. The differences can be stored in a delta file, which, in conjunction with the base version, can be utilized to reconstruct the revised version. Thus, only the delta file needs to be transmitted to the replica location during the replication, rather than the entire file. Because the delta file is typically much smaller than the revised file, the transmission of the delta file to the location of the base file can become much more efficient.

Some methods of identifying the differences between the base version of a file and the revised version involve the generation of a base signature file as a function of the data in the base version, as well as the generation of a revised signature file as a function of the data in the revised version. The two signature files and the revised version can then be utilized to generate the delta file reflecting the differences between the base version and the revised version. A delta file can be created in this manner for each subsequent revision to a file. Because each delta file represents the differences between one version and the next, it can be used in either a forward direction, where it is applied to the base version to reconstruct the revised version, or in a backward direction, where it is applied in an opposite manner to the revised version to reconstruct the base version.

The creation of such a signature file for the base version and for the revised version can utilize signature algorithms which operate on the data in the base version and the revised version. For these purposes, signature algorithms can be utilized which operate on the data in the file and result in the creation of values which represent that data. Rather than using the entire file, the signature values can then be processed and handled for the creation of the delta file. These signature values are shorter and therefore easier and faster to transmit and process as compared to the data in the entire file.

In some such methods utilizing signatures, the data in the base version is divided into blocks, and the signature algorithm operates on all of the data in each block to determine the signature value for the block. Likewise, all of the data in the revised version is consecutively processed by a similar signature algorithm to obtain signature values for the revised version. The signature values from the two versions are then compared to identify the similarities and differences between the two versions and to thereby create a delta file identifying the differences between the two. Then, rather than transmitting the revised version, this delta file is then transmitted to the location of the base file to allow for a replication of the revised version, thereby reducing bandwidth requirements.

Accordingly, the use of such signature algorithms to identify differences between files can result in the creation of very accurate delta files which are transmitted to the desired location across the data connection. Such algorithms can also allow for precise reconstruction of the corresponding version of the file without requiring the transmission of an entire file, thus providing a reduction in the amount of data transmitted. However, the use of at least some such signature and differencing algorithms can be computationally intensive, as they can require sequential processing of the data in the file, even for data that has not changed. Therefore, such processes can be time consuming and have high processing requirements. Moreover, the delta files created by such methods can still require significant bandwidth for transmission and significant memory space for storage, particularly if the differences between the two files are significant.

Accordingly, improved methods and systems are desired for identifying the differences between two versions of a file, and improved methods and systems are desired for replicating a revised version of a file.

SUMMARY OF THE INVENTION

According to one embodiment of the present invention, a computer-implemented method is provided for comparing two versions of a file to determine the differences between the versions. The method of this embodiment comprises obtaining a fine signature and a coarse signature for at least one segment of data of a base file. The method further comprises accessing a revised version of the base file, obtaining a segment of data of the revised version and calculating a coarse signature for the obtained segment of the revised version. In addition, the method comprises determining whether the coarse signature of the obtained segment of the revised version matches the coarse signature for the at least one data segment in the base file. If a match of the coarse signatures is present, a fine signature is calculated for the segment of the revised version of the base file and compared to the fine signature for at least one data segment of the base file. If the fine signatures match, a fine signature for the segment of the revised version is stored. This fine signature can then be utilized to create a delta file, such as, for example, by storing it in a revised signature file along with an offset indicating a location in the revised version. In some embodiments, the fine signatures comprise cyclic redundancy check values, and each coarse signature comprises the integer represented by a predetermined number of bits in the segment.

According to another embodiment, a system for determining differences between a first file and a second file is provided. The system comprises an identification module operative to determine a partial identifier for each of various selected segments of data in the first file, each partial identifier being based upon an ending portion of the data in its corresponding segment. The system further comprises a comparison module operative to compare a partial identifier for a segment of data in a second file to the partial identifiers for the various selected segments in the first file, the partial identifier for the segment of data in the second file being based upon an ending portion of the data in the segment. In addition, the system of this embodiment comprises a generation module operative to generate a delta file reflecting differences between the first file and the second file by using the comparisons of the identifiers.

According to additional embodiments, a method for maintaining an additional copy of a file is provided. The method of this embodiment comprises determining whether to prepare a delta file reflecting differences between a base file and a revised version of the base file based upon at least one of the size of the base file, the size of the revised version, a running measure of the differences between the revised file and the base file, and parameters of the network. If it is determined to prepare the delta file, the delta file is prepared such that the delta file is configured to be utilized to operate upon the base file in order to create another copy of the revised version for replication purposes. If it is determined not to prepare the delta file, an additional copy of the revised version is stored for replication purposes.

According to yet another embodiment, a computerized method is provided for determining whether to create a delta file reflecting differences between a base file and a revised version of the base file. The method of this embodiment comprises determining whether the differences between a base file and a revised version exceed a threshold change amount. If the threshold change amount is exceeded, the completion of a delta file is avoided and, instead, a copy of the revised version is transmitted for replication purposes.

In some embodiments, the determining operation comprises shifting a frame of data in the revised version and deciding whether the shifted frame of data in the revised version has a match with a block of data from the base file, maintaining a running count of the amount of shift, and comparing the count to a threshold to establish if the threshold change amount has been exceeded.

According to another embodiment, a computer-implemented method is provided for comparing two versions of a file to determine the differences between the versions. The method comprises retrieving a mapping of the logical order of data of a first file to a plurality of physical blocks within a memory device, each physical block comprising consecutive memory locations within the memory device. The plurality of physical blocks for the first file are not contiguous across the memory device. The method further comprises determining a first measure, the first measure being based upon the valid data within a first physical block for the first file. In addition, the method comprises retrieving a mapping of the logical order of data of a second file to a plurality of physical blocks within a memory device, each physical block comprising consecutive memory locations within the memory device. Moreover, the plurality of physical blocks for the second file are not contiguous across the memory device. In addition, the method comprises determining a second measure (the second measure being based upon the valid data within a first physical block of data for the second file) and comparing the first measure to the second measure. If the measures match, a signature for the first physical block of data for the first file is compared to a signature for the first physical block of data for the second file, and the comparison is used to create a delta file. In some embodiments, each measure comprises the length of valid data within a physical block.

In accordance with additional embodiments, a system is provided for comparing two versions of a file to determine the differences between the versions. The system of this embodiment comprises a first file comprising a plurality of physical blocks of data located at various allocated positions on a memory device, and a second file comprising a plurality of physical blocks of data located at various allocated positions on a memory device. The system further comprises a set of executable instructions configured to create a delta file by proceeding in logical order of the physical blocks of the first file and comparing a signature parameter for each of these physical blocks of the first file to a signature parameter of at least one physical block of the second file. In some embodiments, the signature parameter can comprise the amount of valid data within the physical blocks.

Various aspects of the present invention will become apparent to those skilled in this art from the following description wherein there is shown and described embodiments of the invention, simply for the purposes of illustration. As will be realized, other different aspects and embodiments can be provided without departing from the scope of the invention. Accordingly, the drawings and descriptions herein are illustrative in nature and not restrictive in nature.

BRIEF DESCRIPTION OF THE DRAWINGS

The accompanying drawings, incorporated in and forming part of the specification, depict several illustrative embodiments, which, together with their descriptions, serve to explain principles of the present inventions. In the drawings.

DETAILED DESCRIPTION OF ILLUSTRATIVE EMBODIMENTS

In general, embodiments of the invention relate to improved methods and systems for generating delta files. In one such method, one or more coarse signatures (e.g. bit patterns) for blocks in the revised version are compared with those coarse signatures for blocks from the base file. If a match is not found for the coarse signature, then a fine signature is not created for that block in the revised version, and a moving frame or window of a set length is moved across the data in the revised file. A coarse signature comparison is made with each movement until a match is found with a corresponding coarse signature in the base file, at which point the algorithm then proceeds to generate and compare a fine signature for all of the data in that matching block. Thus, fine signatures are not created from the data in the revised version unless a coarse signature match has been found, thereby minimizing unneeded time-consuming fine signature calculations. Based upon the coarse and fine signature comparisons, a delta file can be generated.

According to other embodiments described herein, methods are provided for determining whether to initiate a delta file generation algorithm, or whether to utilize amore efficient replication method. This decision can be based upon various file parameters, such as file size thresholds and/or file difference thresholds for instance, and these file parameters can be determined based upon system parameters, such as available bandwidth and processing times. Based upon the decision, if it is likely to be more efficient to utilize some other replication method, that method is utilized.

In accordance with additional embodiments, the size of the data blocks utilized to generate a delta file vary based upon the valid data in the physical segments allocated for the base file across a tangible storage medium. In particular, these embodiments proceed with signature creation based upon the logical order of the physical segments of the file data on the storage medium. Accordingly, efficiencies can be obtained by avoiding the need to continually shift frames of data and instead utilizing the lengths of valid data on the physical segments as a low resolution signature. The lengths can be obtained from physical-logical address mappings of the file data.

Figure 1:
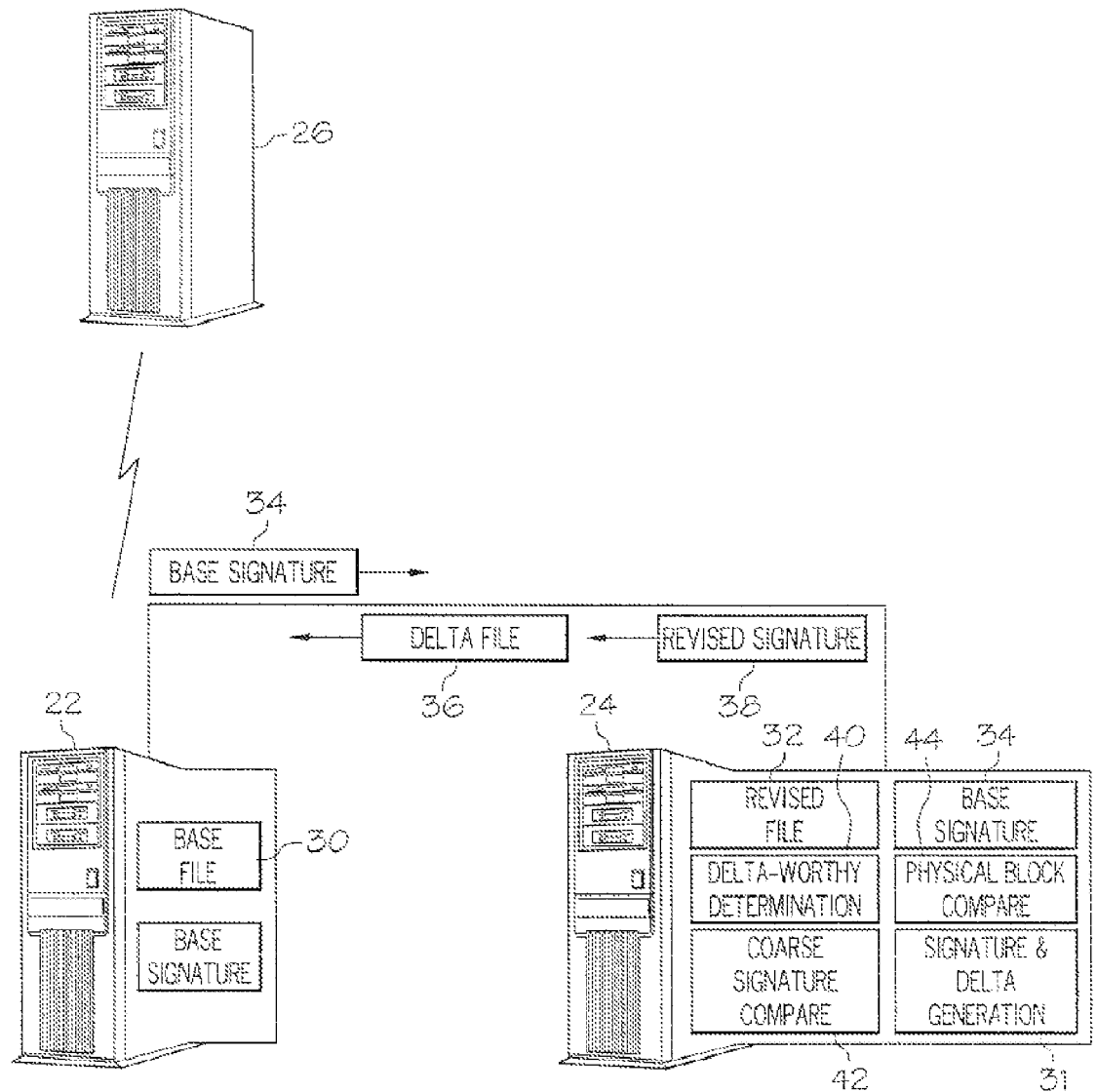
FIG. 1 is a block diagram depicting an illustrative computer system having file replication functions that operate according to principles of the present invention.

Turning now to the drawings in detail, FIG. 1 is a block diagram depicting an illustrative computer system 20 having file replication functions that operate according to principles of the present invention, in this embodiment, the system 20 includes servers 22 and 24 which operate to maintain replicas of one or more files, such as for synchronization or backup purposes. In this example, a base file 30 is maintained on server 22 while another copy 32 of the base file is maintained on server 24. Either copy of the files 30 or 32 can be modified at either server 22 and 24.

Upon detection of a modification to file 32, the server 24 uses a base signature file 34 to generate a delta file 36 which it communicates over the network to server 22. The delta file 36 can comprise a series of commands and data content which indicate how to modify the base file 30 to arrive at the revised version 32. The server 22 then utilizes the delta file 36 to update the base file 30 so that it matches the revised version 32, thereby allowing the two files 30 and 32 to remain substantially identical. The new signature 38 for the revised file 32 can be calculated by server 24 during the delta file creation process and communicated to server 22, such that both servers have the latest signature for use in creating the next delta file after the next revision to the file. Alternatively, the new signature 38 can be calculated by the server 22 after the revised version has been replicated there using the base file 30 and the delta file 36 received. On server 24, the creation of the signatures and delta files can be controlled by a signature and delta file generation module 31 operating on the server 24.

Accordingly, the files 32 and 30 remain in synchronization or as backups to one another with minimal transfer of data across the connections between the servers 22 and 24. In particular, since only a signature file 34 and a delta file 36 need to be transmitted across the network, the data transfer requirements can be minimized. To initiate the generation of the delta file 36, servers 22 and 24 can periodically check for revisions to the files 30 and 32 and can initiate the delta generation process upon a revision, at periodic times, or after a predetermined amount of revision.

In the case of replication for backup purposes, one of the servers 22 or 24 could be designated as the backup server (e.g., 22) and be utilized for backup of files, and the other server could be designated as the primary server (e.g., 24) and utilized for operating on and revising files. In such a case, the primary server would execute the module 31 which would create the delta file 36 and communicate it to the backup server. The delta file 36 would then be saved or backed up by the backup server for use in creating the revised version from the backup copy. The primary server would also create and maintain the signature file 34 for the previous version of the file, but this file need not be transmitted to the backup server as it is typically only used for delta file generation. Accordingly, the signature and delta generation module 31 could reside only on one server 22 or 24 if it is utilized for backup purposes, but could also reside on both servers 22 and 24 if it is utilized for synchronization purposes.

Accordingly, in such systems, multiple versions of delta files can be maintained so that any particular version of a file can be restored. To accomplish this, a revised signature file 38 can be generated from the revised file 32 and, in essence, the revised file becomes the base file for the next version of the revised file. The delta file 36 generated can be applied to the base file 30 to create the revised file 32 at the replica location. Moreover, if desired, the inverse of the delta file 36 can be applied to the revised file 32 to reconstruct the base file 30. The new signature file 38 can be created from the revised version 32 during the creation of the delta file 36 at the location of the revised version, or the new signature file can be created at the location of the base file 30 after the revised version has been replicated there using the delta file.

The files referred to herein may be stored on any suitable storage medium, such as on hard disk drives, CD-ROM drives, backup storage devices, or other memory devices, such as suitable non-volatile optical, magnetic, or electronic memory devices. Moreover, while the computing devices are shown as servers 22 and 24 residing in a network 20, it should be understood that these devices could comprise any of a variety of suitable types of computers, data processors, or other circuitry or hardware connected in a appropriate manner for use in file storage and replication. In addition, the system 20 may include other additional computers 26 or hardware devices as desired.

According to aspects of the present invention, at least one of the servers 22 and 24 includes modules 40, 42 and/or 44 for use in conjunction with the signature and delta generation module 31 for more efficiently generating such delta files and signature files. In particular, in this example, the server 24 includes an analysis module 40 to determine whether it is more efficient to generate a delta file 36 or to just transmit the entire revised file 32 to the other server 22. As will be described in further detail below, this module 40 can analyze the base file 30, the revised file 32, and/or parameters of the system 20 and determine whether a delta file 36 should be generated using process 31, or whether it may be more efficient, in terms of time, bandwidth, and/or storage space, to transmit the revised file 32 without completing the generation of the delta file 36. In one such embodiment, the module 40 can monitor the process of generating the delta file 36 and can halt the process if it is determined that the delta file will be lengthy or that the changes between the two versions of files 30 and 32 are significant. In such a case, the revised file 32 can be transmitted to the server 30 rather than the delta file 36, and a signature can be generated from the revised file for use during the next replication process.

According to another aspect of the invention, a coarse signature comparison module 42 can be provided in order to more efficiently generate delta file 36. This module can be utilized to generate coarse signatures of each block of data in the revised file 32 for comparison with coarse signatures of the blocks of data in the base file 30. A coarse signature, as used herein, is a signature or identifier that represents a block but is based upon less than all of the data in the data block that it represents, that is not computationally intensive, and/or that is not substantially certain to be unique with respect to the coarse signatures determined for other different data blocks in the files. If the coarse signatures for two blocks in the files 30 and 32 match, then the module 31 can be utilized to generate a fine signature for that block in the revised file 32 and to compare that fine signature to the fine signature for the corresponding block in the base file 30. A fine signature is, then, a signature or identifier based upon substantially all of the data in a block of a file, that is computationally intensive, and/or that is substantially certain to be unique with respect to the fine signatures determined for other different data blocks in the files. If the coarse and fine signatures match between the blocks without additional searching for data, then those blocks have not changed between the two files 30 and 32 and commands need not be added to the delta file 36. If either the coarse signature for a block of the revised file 32 or the fine signature for the block does not match respective coarse and fine signatures for any blocks in the base file 30, then it is known that a change has been made, and one or more commands can be added to the delta file 36 to reflect the change. Because the module 42 allows a coarse signature to be used as an initial comparison before checking any fine signatures, increased computational efficiency can be achieved because a fine signature need not be generated for each block. As will be described in further detail below, the coarse signature could comprise a predetermined number of ending bits of data at the end of the block, and/or a predetermined number of bits of data at the start of the block.

In accordance with other aspects of the invention, a physical block comparison module 44 can be utilized along with module 31 for generation of the delta file 36. This module 44 can obtain a map of the physical locations of the variably sized blocks of data which make up the revised file 32 and which are non-contiguous on the memory device. Likewise, the module 44 can obtain a similar map of the physical locations of the variably sized blocks of data which make up the base file 30 and which are non-contiguous on the memory device. The module 44 can then compare characteristics of those maps to determine similarities and differences between the files, such that the delta file 36 can be generated based upon those differences. For example, the module 44 can compare the lengths of the valid data of the physical blocks of the files 30 and 32. For those physical blocks having matching lengths, a fine signature can be generated and compared. When any lengths or fine signatures do not match, a command can be entered into the delta file 36 reflecting the differences between those blocks. By using the physical block lengths as a coarse signature before calculating and comparing any fine signatures, computational efficiency can be achieved. Moreover, the module 44 does not require data to be sequentially scanned for matching signatures using a moving frame of data, as physical blocks of data are utilized instead.

One or more of the modules 40, 42, and 44 can be utilized in conjunction with module 31 for generation of signatures and delta files. Accordingly, each of the modules 40, 42, and 44 can be provided and operate together with the others or can operate separately. Each module can comprise one or more sets of executable instructions, routines, functions, sections of code, software components, programs, or the like, which operate via one or more processors, controllers, computational devices, or appropriate hardware components. While the modules are shown, for the purposes of illustration, as separate entities in the embodiment of FIG. 1, it should be understood that such modules can be provided as an integrated software program, utility, or application. For example, each module could comprise one or more components, instructions or routines within storage management software, such as within Novell's Storage Management Services™ (SMS™) collection of programs for instance.

Figure 2:
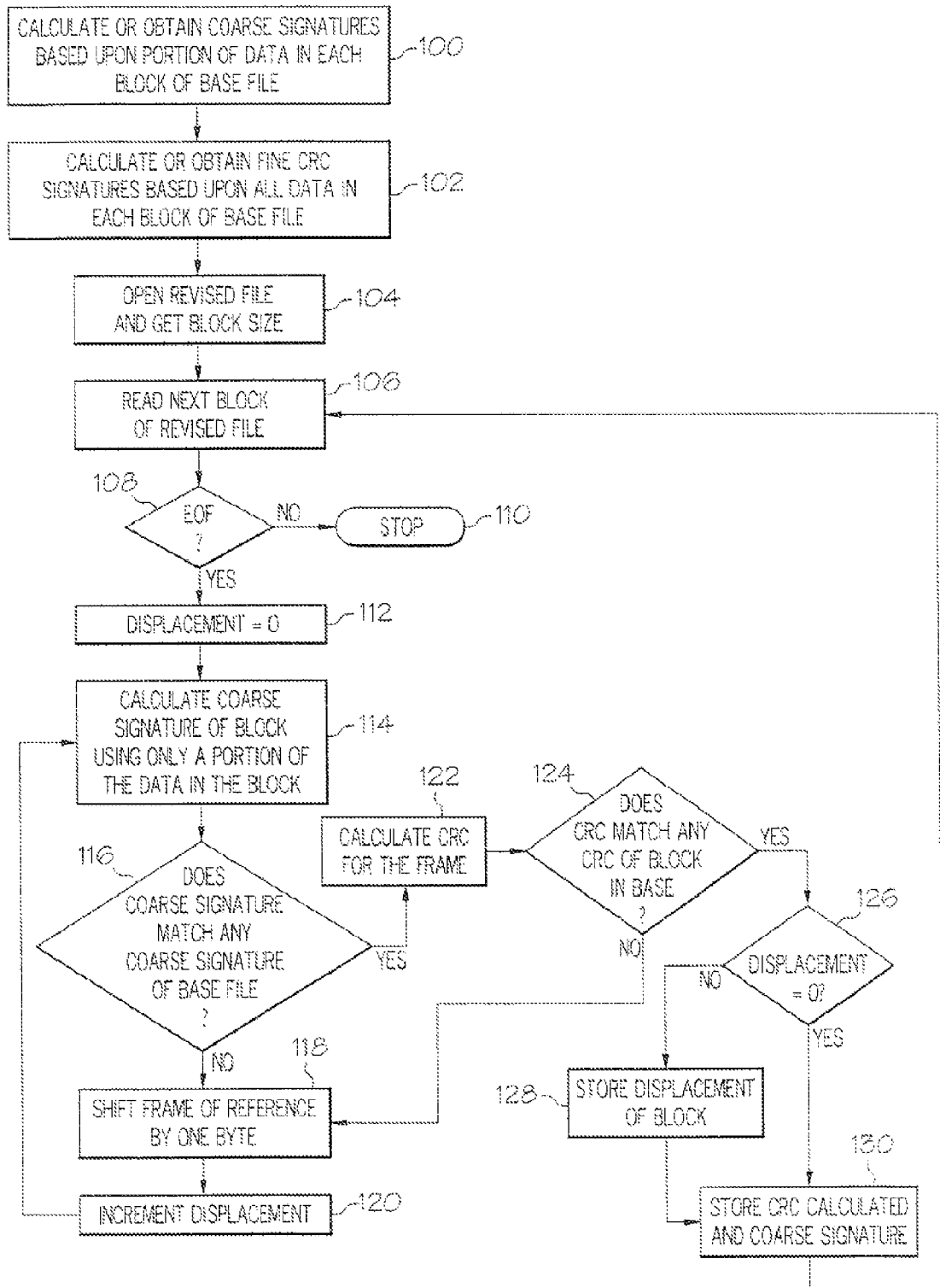
FIG. 2 is a flow chart depicting an illustrative method for generating delta files and signature files, the method utilizing coarse signatures to increase efficiency according to principles of the present invention.

FIG. 2 is a flow chart depicting an illustrative method for generating delta and signature files utilizing coarse signatures to increase efficiency. The process may be implemented in computer-readable instructions and executed by a processor, computer or similar device, such as by server 24 in the example of FIG. 1. In this embodiment, at operation block 100, the coarse signatures for each block of data in the base file are obtained or calculated. For example, these signatures may be available from a signature file that was created from the base file during the previous replication process (or generated from that file during a signature creation process), or these signatures may be obtained directly from the base file or from some other storage location or process. Each segment or block of data in the base signature file includes a coarse signature that identifies the block and is based upon less than all of the data in the block. For instance, the block size could be set at between 4 kilobytes and 16 kilobytes of data, and the coarse signature could comprise the first and/or last 32 bits in the block.

At operation block 102 in FIG. 2, the fine signatures of the blocks of data in the base file are also calculated or obtained. Again, such signatures may reside in a signature file representing the base file which was calculated previously. These fine signature values can be calculated using a signature algorithm, each value taking into account substantially all of the data in a given block of the base file. For example, a cyclic redundancy check (CRC) algorithm could be utilized, as could other appropriate algorithm, such as an MD5 algorithm or a checksum algorithm for instance. Such algorithms produce numbers or data which are highly likely to uniquely identify the entire contents of the block of data. Thus, when the contents of the block change, the fine signature is highly likely to change as well.

A CRC algorithm can be advantageous for such purposes because it typically consumes very little memory space relative to the amount of data that it represents, and therefore provides storage and processing efficiency in handling and comparison of files. A CRC algorithm essentially treats a block of data as a single binary polynomial and divides the number by another fixed binary polynomial, also referred to as the CRC polynomial. The remainder of the division is known as the CRC and the fixed binary number is called the polynomial of the CRC. A conventional CRC algorithm could be utilized for computing the CRC's disclosed herein, as could a table-driven CRC algorithm where a shift, OR, XOR, and table lookup per byte of data can be used to derive the CRC. The use of CRC values for such purposes is disclosed in U.S. Pat. No. 6,233,589, the entire disclosure of which is hereby incorporated by reference herein.

At operation block 104 of FIG. 2, the revised file can be obtained, as can the predetermined block size to be used in analyzing the revised file during the process. The block size should match the block size utilized with respect to the signatures created from the base file. Utilizing the block size, the next block of data in the revised file is then accessed, as shown at operation block 106. For instance, if the revised file has just been accessed for the first time during the process, a first block of data of the revised file can be obtained during this operation, the amount of data in the block being equal to the block size.

At decision block 108 of FIG. 2, it is determined whether the end of the file has been reached when attempting to access the next block in the revised file. In other words, it is determined whether the entire revised file has been processed under the process. If so, then the process can be stopped at terminal block 110. If the end of the file is not reached, then the process continues to block 112, where the displacement variable, for use in generating the delta file and the revised signature file, is set to zero. Moreover, the course signature for the block is calculated or determined at operation block 114. Here, the coarse signature is calculated from or obtained from only a portion of the data in the block, such that the entire amount of data need not be handled. In other words, this module of the method obtains a partial identifier for the block.

Then, at decision block 116 of FIG. 2, the coarse signature for the block of the revised file being considered is compared to the coarse signatures obtained from the base file. Thus, this module of the method determines whether there is a preliminary match of the blocks based upon the partial identification of the blocks provided by their coarse signatures. If a match is found, the process continues toward the calculation of a fine signature for the block, as shown at operation block 122. The fine signature may comprise a CRC calculation for the data in the block.

This fine signature value can then be compared to the fine signature of the block in the base file that had a matching coarse signature value, as shown at decision block 124 of FIG. 2. If there is a match, the coarse and fine signatures can be saved for future uses (e.g., as the signatures of that block of the revised file for use in a future delta generation process) and any displacement needed to obtain the match can also be saved. For example, the displacement can be saved along with the signatures for that block to show where that signature block is located, as well as in a delta file to show where any changes have occurred in the block with respect to the base file. These operations are shown at blocks 128 and 130.

The process then returns to block 106 to consider the next block of data of the revised version. If the end of the file has not been reached, the process continues to operation 112 where the displacement is again set to zero, and to operation 114 where the coarse signature is obtained or calculated for that block. The coarse signature is again compared to the coarse signatures corresponding to the blocks in the base file, at decision block 116. If there is no match for the corresponding coarse signatures, rather than wasting additional processing time calculating a more complex fine signature, the method continues to operation block 118, where the frame of reference is shifted by one unit of memory (e.g., one byte) and a new coarse signature obtained for the shifted block of data under consideration (i.e., for the frame of reference). This shifting can be achieved by importing subsequent data adjacent to the block under consideration into the frame of reference and removing a first portion of the data that had been under consideration. Thus, the frame of reference is the data string under consideration, and this frame can be incrementally shifted across the data in the file (the amount of data in the string being equal to the block size). At block 120 of FIG. 2, the displacement variable or other suitable counter is incremented to indicate that the frame of reference had to be shifted because no match was found. The process then returns to operation 114 which then calculates or obtains a coarse signature for that new frame of data.

Accordingly, the process would continue to follow operation blocks 118, 120, and 114, where the frame of reference would be continually shifted by a predetermined amount of data, the displacement variable would be incremented, a new coarse signature would be calculated or obtained for each new shifted frame under consideration, and the new coarse signature for the frame compared to those of the base file, if the coarse signature of a shifted frame does eventually match a coarse signature for a block of data in the base file, the fine signature can then be calculated for the shifted frame of data, as shown at operation block 122. If the fine signature for the shifted frame also matches the fine signature of the block from the base file, the fine signature and the amount of displacement can be stored, such as in a signature file and a delta file, as shown in blocks 126, 128 and 130. If the fine signatures do not match even though the coarse signatures did match, then the process returns to operation blocks 118, 120 and 114, where the frame of data under consideration is additionally shifted, the amount of shift recorded, and the coarse signatures compared.

Thus, according to this method, a coarse signature check is conducted for each block in the revised file, and if a match is found, then the fine signatures for the matching block are compared. If a match of coarse or fine signatures is not found, then the frame of reference is continually shifted and the coarse signatures continually checked until a match is found, at which point fine signatures are checked. If a match is found of fine signatures, then those signature values are stored in the revised signature file along with any frame displacement amount required to reach the matching data. In this manner, a moving frame or window of a set length is moved across the data in the revised file, and for each movement a coarse signature is used for the data falling within the frame, until a match is found with a corresponding coarse signatures in the base file. For portions of data where the coarse signatures did not match, or where coarse signatures matched but the fine signatures did not match, a delta file can be generated which indicates the differences between the two files.

Figure 3:
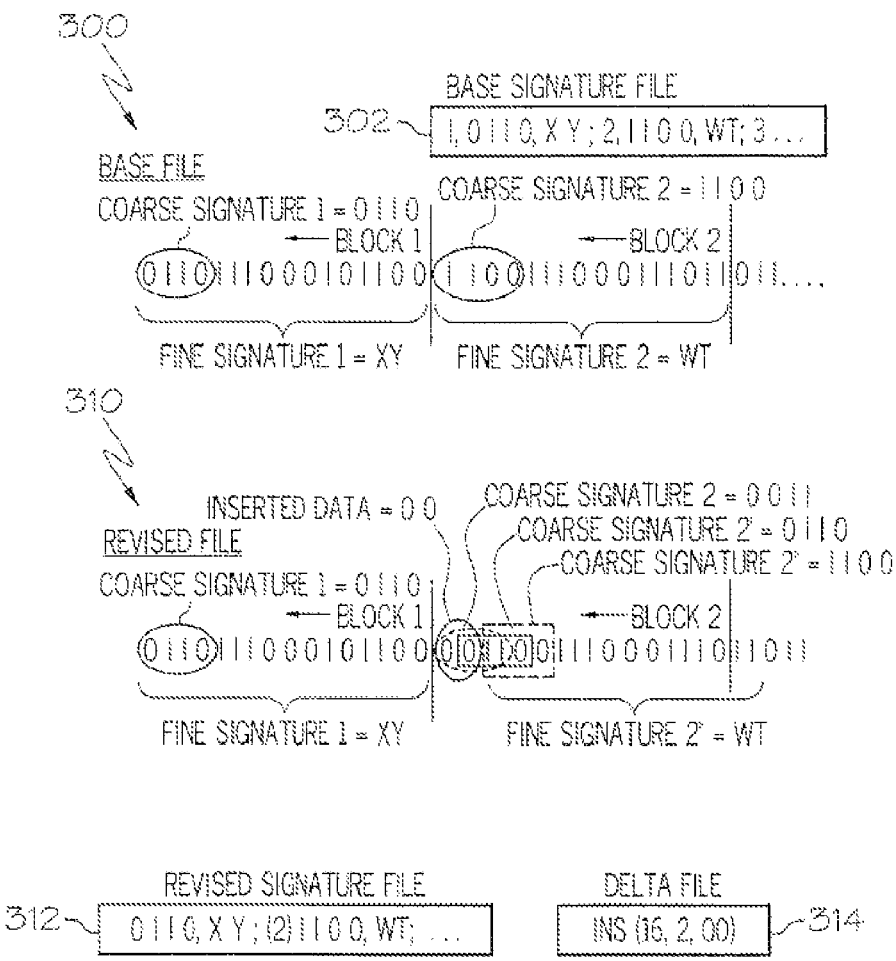
FIG. 3 is a block diagram depicting examples of data files that can be processed and created utilizing principles of the present invention.

FIG. 3 shows an example of how such a process could operate on a base file 300 and a revised file 310, which in this example contains much of the same data as the base file but also contains some additional data. In this example, the base file 300 is divided into segments of data, such as blocks 1 and 2 which comprise 16 bits each. Each segment or block includes a coarse signature which is an identifier for the block that is based upon less than all of the data in the block. In FIG. 3, the coarse signature comprises the first four bits of data in the block. However, other portions of data and divisions are possible. For instance, the block size could be set at between 4 kilobytes and 16 kilobytes of data, and the coarse signature could comprise the first or last 32 bits in the block. (The block size can be selected so that it is not so small to cause a loss in efficiency of the process and so that it is not so large to cause large blocks of data to be provided in the delta file for minor modifications.) Thus, in FIG. 3, the coarse signature is 0110 for block-1 and is 1100 for block 2 of the base file.

In addition to coarse signatures, the base file also has fine signatures associated with each block. In the example of FIG. 3, the fine signature for block 1 of the base file is represented by the value XY, and the fine signature for block 2 of the base file is represented by the value WT. These values represent values calculated using a signature algorithm which takes into account substantially all of the data in the respective block. For example, as discussed above, these values could be obtained using a cyclic redundancy check (CRC) algorithm, or other appropriate algorithm, such as an MD5 algorithm for instance. The coarse and fine signatures for these blocks of the base file can be stored in a signature file 302 for the base file, or in other appropriate storage locations. By using signature files, only the signature file needs to be stored at or transmitted to the corresponding replica location for delta file generation. The entire file need not be transmitted as the signature file provides a reliable unique identification of the data in the file.

During the process which generates the delta file, such as the process of FIG. 2 for instance, the data for the first block, of the revised file 310 can be obtained. The coarse signature for the block can then be determined. In the example of FIG. 3, the coarse signature for block 1 is the first 4 bits of the block, which comprises the bit pattern 0110 in this example. After being obtained, this coarse signature for block 1 of the revised file can be compared to the coarse signatures of the base signature file 302. In the example of FIG. 3, the coarse signature for block 1 of the revised file 310 is equal to 0110 and this bit pattern matches the coarse signature 0110 for the first block of data of the base file. Accordingly, the process could continue to then calculate a fine signature for the block. Again, the fine signature can comprise a CRC calculation for the data in the block. In FIG. 3, the fine signature for block 1 of the revised file 310 is equal to the value XY.

This fine signature value can then be compared to the fine signature of the block in the base signature file 302 that had a matching coarse signature value. In particular, the value XY can then be compared to the fine signature of block 1 of the base signature file 302, which also is equal to XY in the example of FIG. 3. Accordingly, since there is a match, the fine signature can be saved for future uses and any displacement needed to obtain the match can be used for generating a delta file. With reference to the example of FIG. 3, block 1 of the base file has a matching coarse signature and fine signature with block 1 of the revised file. Therefore, the coarse signature (0110) and the fine signature (XY) for this data is then stored in the revised signature file 312, which is also shown in FIG. 3. No delta command need be added to delta file 314, as there was no displacement in data in finding the match.

This signature and delta file generation process can then consider the next block of data of the revised file 310. In addition, the process can obtain the coarse signature for that block. In FIG. 3, the coarse signature for block 2 of the revised file 310 would be equal to 0011, and this value could be compared to the coarse signature values in the base signature file 302. However, when compared to the coarse signatures of the base signature file 302, it is determined that there is no match for this coarse signature. Accordingly, rather than wasting additional processing time calculating a fine signature for block 2 of the revised file 310, the frame of reference is shifted by one bit and a new coarse signature is obtained for the shifted block of data under consideration. In other words, in the example of FIG. 3, instead of considering bits 17 to 32 to be the block under consideration, a shifted block (frame) comprising bits 18 through 33 is considered. A displacement variable or other counter can then be modified to indicate that the frame of reference had to be shifted because no match was found.

The process then obtains a coarse signature for that new frame of data (i.e., for bits 18 to 33). As shown in FIG. 3, this new shifted block of data has a coarse signature (coarse signature 2') of 0110. However, in this example, this new coarse signature 2' still does not match a coarse signature of the base signature file 302. Therefore, in this case, time and processing will not be wasted on calculating the fine signature for the shifted block (bits 18 to 33) of the revised file, because the coarse signatures indicate that the blocks are not the same. Instead, the frame of reference would again be shifted by one bit, the displacement variable would be incremented, and a new coarse signature would be obtained for the new shifted block.

This additional shift would result in a new frame of data comprising bits 19 to 34. The coarse signature (coarse signature 2") for this new shifted block would be 1100 in this example. Thus, the new coarse signature 2" then matches the second coarse signature of the base signature file 302 (i.e., it matches coarse signature 2 for block 2 of the base file 300). Accordingly, because of the coarse signature match, the fine signature (fine signature 2") can then be calculated for this new block of data. Here, the fine signature value is represented by the value WT, which also matches the second fine signature in the base signature file 302 (i.e., it matches fine signature 2 of the second block of the base file 300).

Accordingly, because a match is found between block 2 of the base file and bits 19 to 34 of the revised file, the revised signature file 312 can be written with values indicating the coarse signature and fine signatures for this matching block. However, because the block had to be displaced prior to finding the match, the amount of displacement should also be indicated in the revised signature file 312. In this case the displacement was 2 bits, so this is saved in the revised signature file 312 adjacent the matching coarse signature of 1100 and the matching fine signature of WT.

In addition, because a shift occurred, primitive commands are written to the delta file 314 to save the displacement content. In this example, the content was an additional two bits of data inserted after bit 16 and having the values 00. An illustrative command to insert this data would be: INS (16, 2, 00). This illustrative command indicates that after the 16th piece of data, 2 pieces are to be inserted having the values 00.

Therefore, depending on the changes found using such methods, a delta file 314 can be generated which comprises insert and delete commands that represent the differences between the two files. Moreover, a revised signature file 312 can also be generated which includes a coarse signature and a fine signature for all matching blocks of data between the base file 300 and the revised file 310, as well as displacement values indicating where those matches occurred. Such files can be created without unnecessary calculations of CRC values for blocks in the revised file, because a CRC calculation is not conducted until there is a coarse signature match. Because coarse signatures are easier to process than fine signatures such as CRC values, processing efficiency can be achieved.

Figure 4:
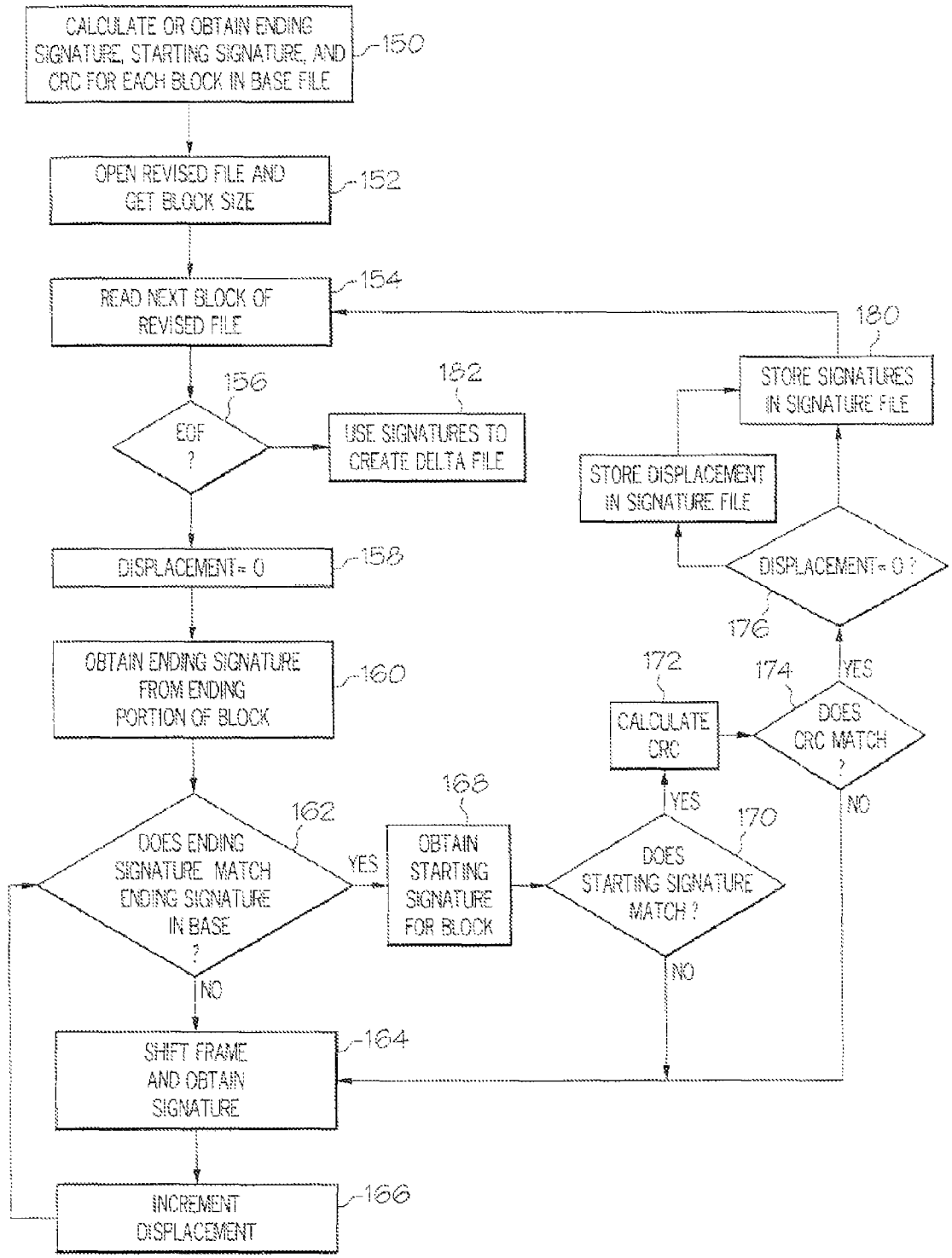
FIG. 4 is a flow diagram illustrating an alternative method for generating delta and signature files, the method utilizing coarse signatures according to principles of the present invention.

FIG. 4 is a flow diagram illustrating an alternative method for generating delta and signature files utilizing coarse signatures, according to principles of the present invention. This method is similar to that of FIG. 2, except that two coarse signature checks are conducted prior to calculating each fine signature. In particular, the method of FIG. 2 can result in some unnecessary fine signature calculations in the event that a coarse signature for a block matches the base file where the fine signature for that block did not. Accordingly, by use of two coarse signatures such false matches can be further reduced.

More specifically, in this illustrative embodiment, at operation block 150, two coarse signatures and one fine signature are obtained for each block of data in the base file. In this example, the coarse signatures are signatures based upon different portions of data from the data in each data block. In particular, an ending signature can be obtained which represents a predetermined number of bits (e.g., 32) at the end of the block and a starting signature can be obtained which represents a predetermined number of bits (e.g., 32) at the start of the block. As an alternative, the ending and starting signatures could be calculated using a signature algorithm that operates only on the portion of data near the start or the end of the block. The fine signature is a signature value highly likely to uniquely identify the block, and in this example is a CRC value based upon the entire contents of the block.

In addition, in the example of FIG. 4, the revised file is accessed and the block size to be used is obtained, as shown at operation block 152. The next block of the revised file is read, as shown at operation block 154, and a check is conducted to determine if the end of the file has been reached, as shown at operation block 156. If the end of the file has not been reached, the displacement value is set to zero and the ending signature of the block under consideration is obtained, as shown at operation blocks 158 and 160. As mentioned above, the ending signature is a coarse signature derived from the end portion of data in the block. For example, it could comprise a predetermined number of bits at the end of the data block (e.g., the last 32 bits). It can be derived in the same way that the ending signatures for the base file were derived.

This ending signature is then compared with the ending signatures in the base signature file, as shown at decision block 162. If no match is found, then the frame of reference is shifted by a predetermined amount (e.g., by one byte) and a new ending signature for this new block of data is obtained, as shown at operation block 164. In addition, the displacement counter is incremented at block 166 to indicate that the data block has shifted due to the lack of a match.

The ending signature for the shifted block can again be compared to the ending signatures in the base signature file at decision block 162, and steps 164 and 166 can be repeated until a match is found.

When a match is finally found of ending signatures, then the starting signature for the matching block can be obtained, as shown at block 168. The starting signature can be derived in the same manner that the starting signatures for the base file were derived. In one embodiment, the starting signature comprises the first 32 bits of data in the block.

At decision block 170, it is determined if the starting signature matches a starting signature for the blocks of the base file. If no match is found, then the process returns to blocks 164, 166, and 162, where the frame of reference is again shifted, a new ending signature obtained and a new ending signature comparison conducted. However, if a match of starting signatures is present, then the process continues to block 172 where the fine signature (in this example, a CRC) for the block under consideration is calculated. The CRC is then compared to the CRC's in the base signature file, at decision block 174. Again, if no match is found, the process returns to blocks 164, 166, and 162, for additional shifting of data and coarse signature comparisons. Therefore, in this example, a CRC need not be calculated until both starting signatures and ending signatures match between a block of the revised file and a block of the base file.

If the ending signatures, starting signatures and CRC's all match between a block of the base file and a block of the revised file, then the process continues to decision block 176 where it is determined if the displacement is equal to zero. If not, then the displacement is stored to indicate that the next entry represents a shifted frame of data, as shown at block 178. In addition, the signatures obtained for the matching data block are stored, as shown at operation block 180. Thus, a starting signature, an ending signature and a CRC value can be stored for the block in the revised signature file. As discussed above, the amount of displacement and the signatures can be stored in a signature file that represents the data in the revised file.

Then, the next block of data is obtained from the revised file at operation block 154, and the process continues to process the revised file in a similar manner. Once the end of the file has been reached, then the signature file created can be used to create a delta file by indicating the differences between the files, such as in the manner discussed above or in other suitable manners using appropriate programming algorithms or modules. As an alternative, the delta file can be created during the processing steps (158 to 180) such as was discussed above with respect to FIGS. 2 and 3. The creation of the delta file is shown at operation block 182.

Figure 5:
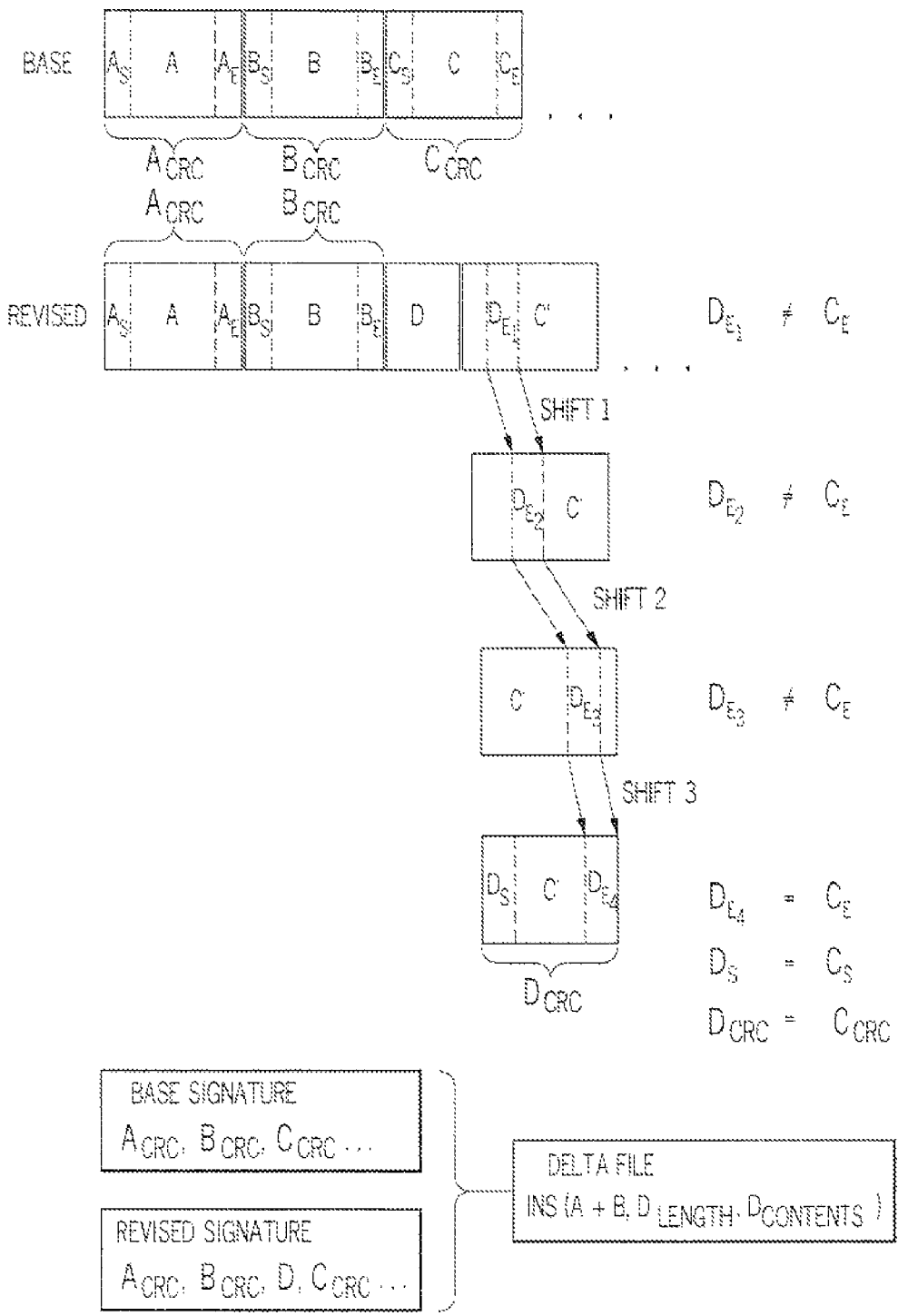
FIG. 5 is a schematic diagram illustrating the operation of the method of FIG. 4 on data blocks in an exemplary revised file.

FIG. 5 is a schematic diagram illustrating the operation of the method of FIG. 4 on data blocks in an exemplary revised file. In this example, the base file includes blocks A, B, and C, and each of these blocks has a starting signature ($A_s$, $B_s$, and $C_s$ respectively), an ending signature ($A_E$, $B_E$, and $C_E$ respectively) and a CRC value $A_{CRC}$, $B_{CRC}$, and $C_{CRC}$ respectively). In this example, the ending signature for block A of the revised file matches the ending signature for block A of the base file, the starting signature for block A of the revised file matches the starting signature for block A of the base file, and the CRC's for block A also match. Accordingly, based on these comparisons, $A_{CRC}$ is stored in the revised signature file. Similarly, since all three signatures match for block B of the two files, then $B_{CRC}$ is written to the revised signature file.

However, the revised file includes additional data in segment D, inserted between blocks B and C. Accordingly, the initial ending signature for the block where C was located would be $D_{E1}$, which does not match $C_E$. Accordingly, the frame could be shifted and a new ending signature obtained. But again, this ending signature $D_{E2}$ does not match that of block C of the base file. Accordingly, additional shifting of the data occurs to include additional data logically succeeding segment D and to exclude data previously included, until the ending signature $D_{E4}$ matches $C_E$. At this point, the starting signature $D_s$ for the shifted data stream frame can be obtained and compared to that of block C of the base file. Since the two match, then the CRC calculation can be made. Finally, since the CRC's match ($D_{CRC}$ matches $C_{CRC}$) then the revised signature file can be written such that it is indicated that segment D is located between signature $B_{CRC}$ and $C_{CRC}$. Then, the delta file can be created showing that the data in segment D ($D_{contents}$) of length $D_{length}$ is to be located after blocks A and B of the base file.

Therefore, according to the example of FIG. 4, the use of an ending and a starting signature can reduce the likelihood that a CRC will be calculated unnecessarily (i.e., without having a match in the base signature file). Accordingly, as shown by FIG. 4 and the other alternatives discussed herein, various optimizations and modifications to the methods described herein can be made as desired or suited for a particular application.

For example, as a further optimization, the method could also include steps to decrease the number of computations needed to obtain the next CRC if a false CRC match is encountered. In particular, after decision block 174 of FIG. 4, if the CRC did not match, then a counter can be started to count the number of shifts that occur at operation block 164 before another ending and starting signature match is found (via decision blocks 162 and 170). If the count at this point is less than a threshold count value, then the CRC need not be recalculated for the block having ending and starting signatures that match a block of the base file. Rather, the previously calculated non-matching CRC could be incrementally updated for each shifted frame of data based upon the data that is removed from and added to the new frame with respect to the old. The count threshold can be set such that computing a fresh CRC value for the current frame will be significantly more time consuming than incrementally updating the previous CRC.

One illustrative method of conducting such an incremental CRC update will now be described. More specifically, in this method, when a frame of reference is shifted by one byte, the MSB (most significant byte) of the old frame is moved out, all bytes are shifted one byte left and a new byte is read in as the LSB (least significant byte) of the frame. If the old frame generated a CRC ($CRC_{old}$) then to calculate the new CRC ($CRC_{new}$), the entire CRC algorithm need not be run for the data of the new frame. Instead the effect of the MSB can be removed from $CRC_{om}$. To accomplish this, a CRC table can be used (referred to here as the msbCRCTable) which contains statically determined CRC's for 256 8-bit patterns, treating them as MSB's of a frame size bit stream and treating the rest of the bytes as 0's. Thus, the following equation can be executed:

$$\text{temp}=\sim(CRC_{old})^\sim(\text{msbCRCTable}[MSB]) \qquad \text{EQ. 1}$$

Then, the effect of the new byte can be brought into value temp to obtain the new CRC. For this effect, another CRC table can be used (referred to here as the CRCTable) that contains statically determined CRC's for 256 8-bit patterns. Accordingly, the new CRC can be calculated using the value temp, the new byte brought into the frame, and the CRCTable, as shown in the following equation:

$$CRC_{new}=\text{CRCTable}[((\text{temp}>>24)^\text{newByte})\&0xFF]^\wedge (\text{temp}<<8) \qquad \text{EQ. 2}$$

Thus, at step 172 of FIG. 4, the entire CRC algorithm need not be recalculated if a previous false CRC match had occurred. Rather, the previous CRC calculated can be incremented according to the differences between the previous and current frame.

In addition, other alternatives and optimizations are possible for the methods described herein. For instance, to minimize file difference reflected in the delta file, a dynamic programming technique called the longest common subsequence (LCS) can be used. According to the LCS technique, the revised bit patterns are traversed in their longest common subsequence order with respect to the base bit patterns, and the blocks represented by revised bit patterns are used to create the delta file.

More specifically, several methods may be utilized for finding the longest common subsequence of two strings, 'A' of length m=|A| and 'B' of length n=|B|. In one such method, the length of the longest common subsequence is found using a recursive algorithm such as the following:

```
LCS_Length(char *A, char *B)
{
    if(* A == '\0' || *B == '\0')
    return 0;
    else if(*A == *B) return (1 + LCS_Length(A+1, B+1));
    else return( MAX(LCS_Length(A+I, B), LCS_Length(A, B+I)) );
}
```

To optimize this algorithm, intermediate results may be stored in an array, allowing for the re-use of results from previous computations and improved efficiency. In particular, a two dimensional array L of size m*n can be initialized to contain the value −1 at every position.

Then the following routine can recursively find the LCS of two strings A and B:

```
char * A, *B;
LCS_Length(char *AA, char *BB)
{
    A=AA; B=BB;
    /* Allocate and initialize array L to contain −1 at all locations */
    return LCS_SubString(0, 0);
}
/* i and j are the offsets from the start of strings A and B. Here the LCS is
```

```
found of sub-strings A + i and B + j. */
LCS_SubString(int i, int j)
{
    if(L[i][j] < 0)
    {
        if (A[i] == '\0' || B[j] == '\0')
L[i][j] = 0;
        else if (A[i] = B[j])
L[i][j] = 1 + LCS_SubString(i+1, j+1);
        else
L[i][j] = MAX(LCS_SubString(i+1, j), LCS_Substring(i, j+1));
    }
    return L[i][j];
}
```

In particular, at location L[i][j], the routine can store the length of LCS of substrings A+i and B+j. A value of 0 at the position L[i][j] then indicates that substrings A+i and B+j do not have any matching characters. Also, a value at L[i][j] that is not '−1' indicates that computations for sub-strings A+i and B+j have already been conducted, and the value of L[i][j] is the LCS of these sub-strings.

Once the array is obtained, finding the LCS substring itself could then be attained by moving through the 2D array starting from (0, 0) to (m, n) in such a way as to cover all values from L[0][0] to 1. Other suitable techniques could be utilized for finding the LCS of the patterns in the base signature file and revised signature file.

As each revised bit pattern is traversed in LCS order, the differences between the data blocks in the base file and the data blocks in the revised file are determined and written to the delta file. As discussed, the delta file generated can contain a series of insertion or deletion primitives that indicate the operation (insertion/deletion), offset, length(for deletion/insertion) and data (for insertion). Accordingly, by the use of such LCS techniques, the size of the delta file can be minimized.

As another alternative that may be used in conjunction with the above methods or other delta file generation techniques, it can be determined whether it is desirable to create a delta file before initiating or completing the delta file generation process. In particular, if it is likely that the size of the delta file will be relatively large anyway, then it may save time, storage space, and/or bandwidth to transmit the entire revised file to the replication location rather than transmitting a delta file.

Figure 6:
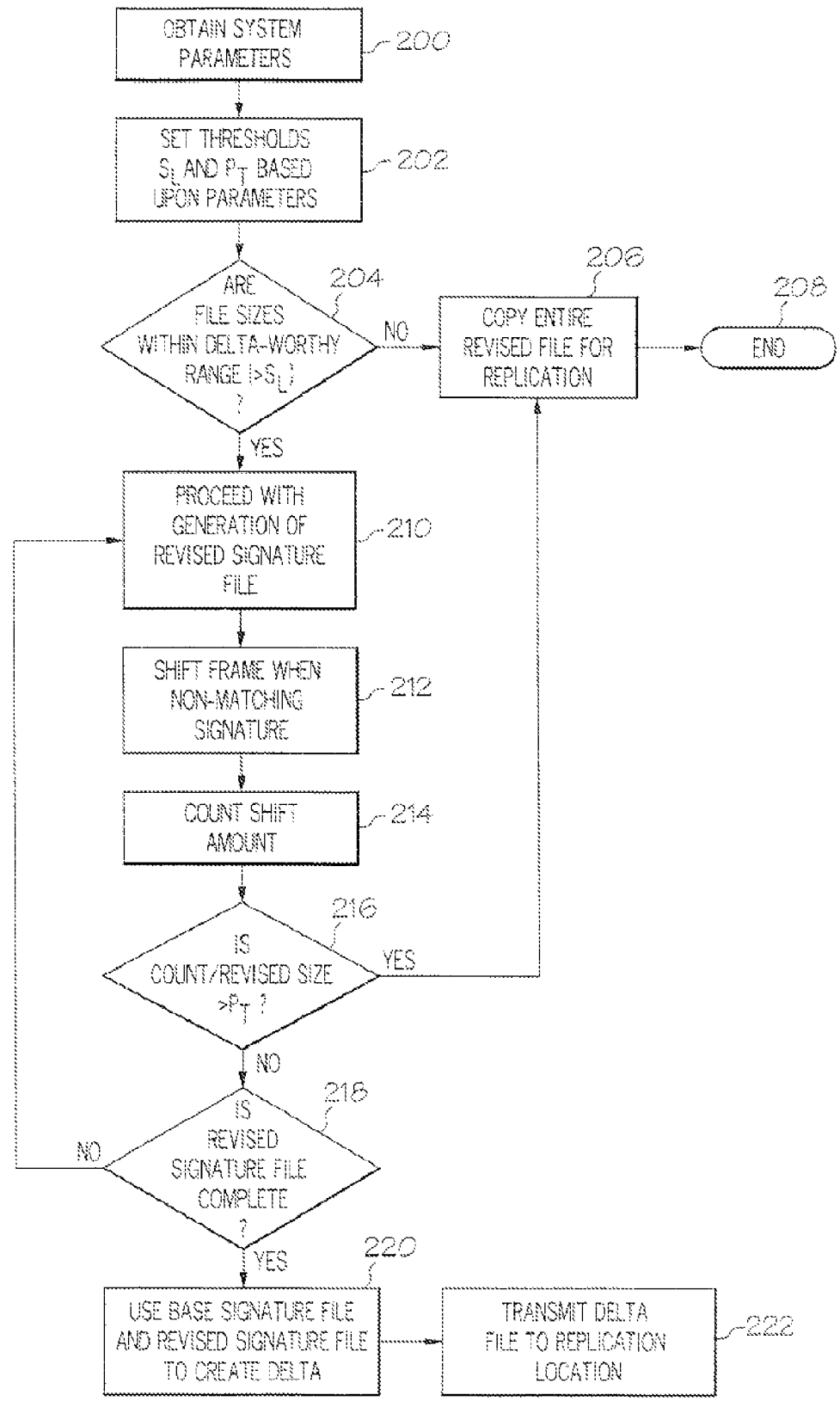
FIG. 6 is a flow diagram depicting an illustrative method for determining whether to create a delta file, the method operating according to principles of the present invention.

FIG. 6 is a flow diagram depicting one such method for determining whether to create a delta file. In accordance with this method, the decision of whether to create a delta file is based upon parameters of the system being utilized as well as the size of the base and/or revised files. If it is determined at some point that it would likely not be efficient to create the delta file, then the revised file would be utilized for replication instead.

More specifically, in this example, the system parameters are obtained at operation block 200. The parameters that are obtained can include any of a number of parameters related to the computer system being utilized, such as measures of the network, storage, and CPU capability.

The thresholds for creating a delta file can then be set based upon these parameters, as shown at operation block 202. For example, if surplus network bandwidth and storage space are available, then the conditions for a base file and revised file to qualify as worthy of creating a delta file can be less stringent. In practice, this could be achieved by setting a percentage change threshold ($P_T$) to a higher number. As discussed in detail below, this threshold could define the acceptable amount of differences between the base file and the revised file encountered during processing before the delta creation process will be canceled. In addition, the system parameters could be used to set the allowable file size ($S_L$) that the base file and revised file must exceed before initiating the processing of the delta file. Typically, a pair of files having a relatively small size would not be considered worth creating a delta file, as they require very little storage space and bandwidth anyway. In such cases, instead of creating a delta file, the entire revised file can be transmitted to the replica location instead.

The thresholds utilized could be established automatically or manually during operation block 202. For example, the system could continually monitor its own parameters and automatically set the file size limit SL and the percentage change limit PT based upon the most recently measured parameters. In such an embodiment, a look up table could be provided correlating parameters to thresholds, such that the system can automatically select the thresholds desired based upon the parameters measured. Alternatively, the system parameters could be periodically monitored by the user and the user could then configure the thresholds as desired.

Accordingly, once the acceptable thresholds have been set, they can be used to make determinations whether to proceed with delta file generation. In particular, the combined file sizes can be compared to the size threshold SL at decision block 204. If the threshold is not exceeded, then the entire revised file can be transmitted to the replica location, as shown at operation block 206. This is because the file sizes are sufficiently small that they would not significantly affect storage space or bandwidth.

However, if the files sizes do exceed the threshold SL, then the delta generation process can commence, as shown at operation block 210. Such a process can be similar to those embodiments discussed above with respect to FIGS. 2 and 4, or to other delta file generation methods.

During the delta file generation process, the frame of reference can be shifted whenever a signature does not match between blocks, as shown at operation block 212 and as discussed above. For each shift, a byte counter can be incremented, as shown at operation block 214, to keep track of the number of bytes shifted during the process. This count can then be divided by the revised file size, and the ratio compared to the change threshold $P_T$ as shown at decision block 216. If the threshold PT is not exceeded, then the delta file generation process may continue to block 218, where a determination is made whether the end of the file has been reached. If the did of the file has not been reached, then the process returns to operation block 210 for additional processing of the revised file. If the end of the file has been reached, then the base signature file and revised signature file may be used to create the delta file, as shown at block 220. The delta file can then be transmitted to the replica location, as shown at block 222.

However, if the threshold $P_T$ is exceeded during the process (as determined at decision block 216), then the delta file generation process can be discontinued. Instead, the entire revised file can be copied to the replica location, as shown at block 206. This is because the amount of changes between the files are already so large that the likelihood is high that a relatively large delta file would be created. Thus, rather than spending the extra processing time in creating that file, which would consume a large amount of bandwidth and storage space anyway, efficiency can be achieved by ending the process and proceeding with copying the entire revised file. Accordingly, waste of CPU cycles can be minimized when there would be no significant value in terms of reduction in transmission bandwidth and storage space.

Various threshold values can be utilized depending on the system and the efficiency desired. In some embodiments, $P_T$ could be set to a value of between about 30 percent and about 45 percent. Likewise, the file size threshold level $S_L$ could be set to between about 0.05 MB and 1 MB. The exact values of these parameters can depend upon the computing system parameters and requirements. The thresholds can help maximize the tradeoff between bandwidth/storage space efficiencies and processing time efficiencies.

Other parameters could also be utilized in addition to or as alternatives to those discussed above. For instance, rather than utilizing a frame shift counter, other methods could be utilized of keeping a running count of the differences between the files during the delta file generation process, such as by monitoring the delta file size as it is built. As another alternative, rather than keeping a running count, the revised file size could be initially compared to the base file size to determine whether the delta generation process should be commenced.

In accordance with still other aspects of the present invention, delta files can be generated by first comparing sizes of valid logical data on physical blocks before proceeding with more computationally intensive fine signature comparison. Accordingly, the size of valid logical data on physical blocks of the base file and revised file can be utilized as a coarse or low-resolution signature that does not provide high probability of uniquely identifying the data in the physical block, but does provide some measure or signature for identifying the data.

More specifically, in a file system, larger files are typically spread across various allocated physical blocks of storage space on the storage medium, such as on a magnetic hard disk for example. The physical blocks across the medium are typically uniform in size, and the specific physical blocks utilized for a given file are usually non-contiguous, meaning that, located physically between two physical blocks of a given file, there may be data for other files or free blocks. A file descriptor is therefore maintained by the file system, which would typically include an identifier of the file and a pointer to a physical-logical map for the file. The map would indicate which physical blocks of storage space are included in the file, and the logical order of these blocks for reconstruction of the file. The actual types and configurations of such maps can vary depending on the operating system utilized. One illustrative type of map includes a listing of the physical addresses of the various physical blocks, the amount of valid data for the file at that location, as well as the corresponding logical address for the data in the file.

Often the size of physical blocks on the storage medium is constant, while the size of the valid data present in the block may vary. Whether a physical block is filled with valid data can depend upon what happened on the file since its creation. For example, if some data is logically inserted in the middle of a file, the file system would not need to shift all bytes physical on the storage medium, but rather could allocate a new physical block, write new data to the block, and update the physical-logical map to reflect, the new logical order of the physical blocks of the file. If space is available within the physical block that is associated with the logical address where changes are being made, then the file system could choose to update only that block. Thus, when data is added to or deleted from a file, the data across the entire logical length either expands or shrinks, affecting the addresses of the logical blocks defined. However, many physical blocks of data often remain unchanged. In many file systems, these unchanged physical blocks occupy the same physical location on the storage medium as they did prior to the file revision.

According to aspects of the present invention, the physical-logical mapping of a base file can be compared to that of a revised file and can thereby be utilized to determine differences between the two and to generate delta files. In one embodiment, the base signature file comprises multiple sequences of three values for each physical block of data in the file. In this embodiment, the first value in a sequence is a logical offset of the start of the physical block in the file, the second value is the length of the valid data in that physical block, and the last value is the CRC for the data in that block. The offset and length can be obtained from the physical-logical map, and the CRC can be calculated using a CRC algorithm.

Then, the physical blocks of data in the revised file can be obtained. If the first physical block of data has a valid data length matching that of the base signature file, then the CRC for the physical block can be calculated and compared to that in the signature file, and if the CRC also matches, then the block has not changed. However, if the length has changed or if the CRC does not match, then changes have been made and the changes can be noted in a delta file. More specifically, the physical block which occurs next (logically) in the file can then be accessed and a similar comparison made to the same block of the base file until a match has been found. The changed blocks found prior to the match are then used for generation of the delta file. Accordingly, frames of reference need not be shifted as in the previous methods discussed. Moreover, the amount that the files differ can be quickly determined by comparison of the physical-logical maps of the two files. This amount can then be utilized for determination of whether to create the delta file or whether to instead transmit the entire revised file for replication.

Figure 7:
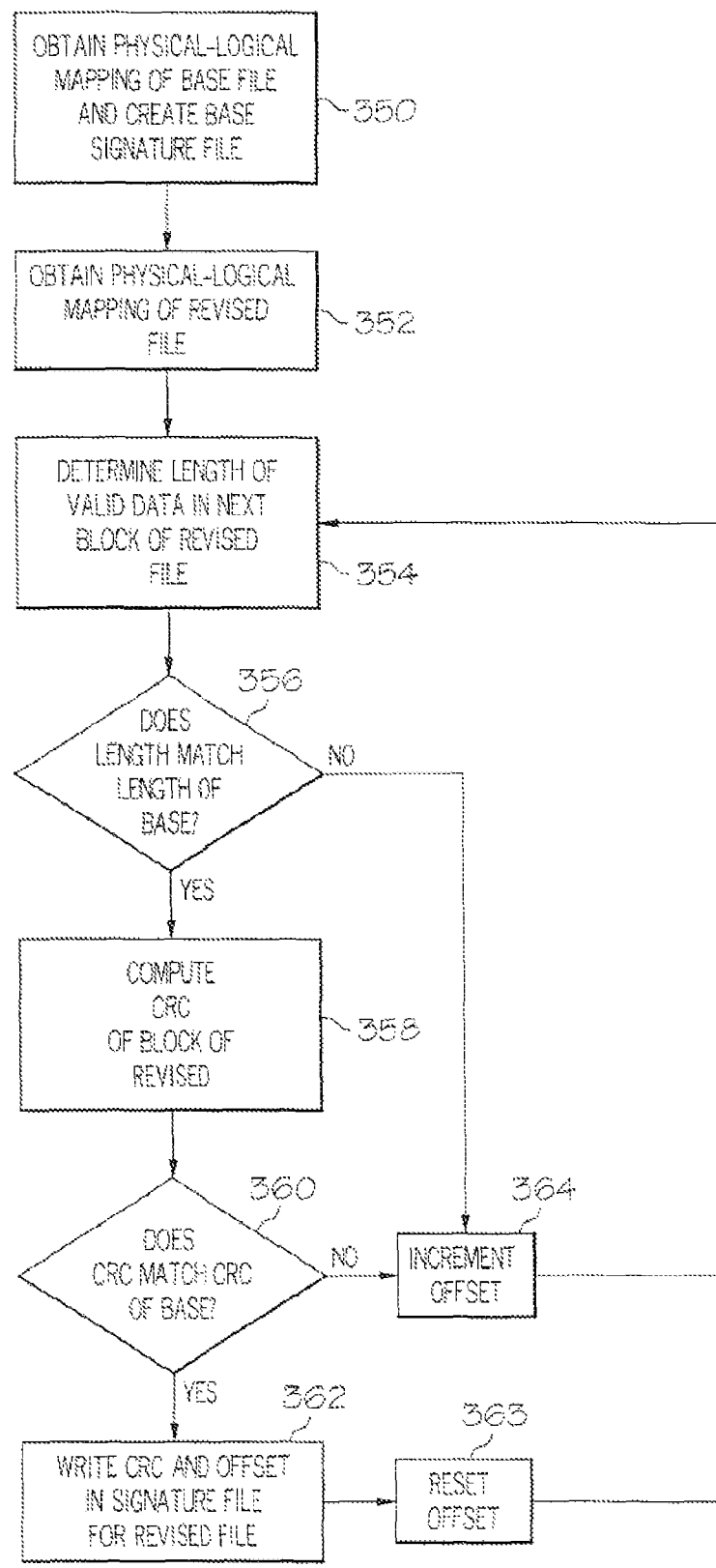
FIG. 7 is a flow diagram depicting one illustrative method of generating signature files utilizing physical-logical file maps, according to principles of the present invention.

FIG. 7 is a flow chart depicting one illustrative method of generating signature files utilizing such physical-logical file maps, according to principles of the present invention. In this example, the physical-logical map for the base file is obtained and used to create a base signature file identifying the signatures of the physical blocks of data in the base file. Each such physical block is an allocated block of memory on the memory device and the blocks need not be contiguous across the memory device or be completely filled with valid data. Accordingly, the length of the valid data in the block can be used as a low resolution or coarse signature for the block and this length may be obtained directly from the map. For confirmation purposes, a high resolution or fine signature of the data in the block can also be obtained, such as by using a CRC signature algorithm for example. Therefore, the signature for each physical block in the base file can comprise the length of the valid data in the block, acting as an initial signature or basic identifier, and the CRC for the block, acting as a final confirmation signature or more complex identifier.

The physical-logical mapping of the revised file can also be obtained, as shown at operation block 352. This mapping can be used to initially compare the physical blocks of the revised file to those of the base file.

At operation block 354, the length of the valid data in the next physical block in the revised file is obtained. This next block would be the next one in its logical order from start to end of the logical order of the data in the file. Then, at decision block 356, the length (of the valid data) of that block is compared to the length (of the valid data) of the next physical block in the base file (i.e., the next one with respect to the logical order of the file). If no match is found, then an offset or displacement counter can be incremented at operation block 364 and the process can return to operation 354 where the length of the next block in the revised file can be obtained.

Once a match of valid data lengths is found, however, the process then continues to operation 358 where the CRC for the matching block of the revised file is calculated. Any suitable CRC algorithm, such as those disclosed above for instance, can be utilized for this purpose. Then, this CRC is compared to the CRC of the block of the base file whose length that block matched. If the CRC does not match, then the offset can be incremented at the next block analyzed, as shown at operations 364 and 354. However, if the physical blocks have both matching valid data lengths and matching CRC's, then that CRC can be written to the revised signature file along with the offset value, as shown at operation block 362. The offset value can be reset at operation block 363, and the process continued for the next physical block of data in the revised file, until the entire revised file has been processed.

Thus, the result of the illustrative method of FIG. 7 is a revised signature file which indicates the matching signatures and the displacements for the non-matching blocks. Then, this revised signature file can be compared to the base signature file to obtain the delta file, which can contain primitive commands indicating the differences between the files, as discussed above.

Figure 8:
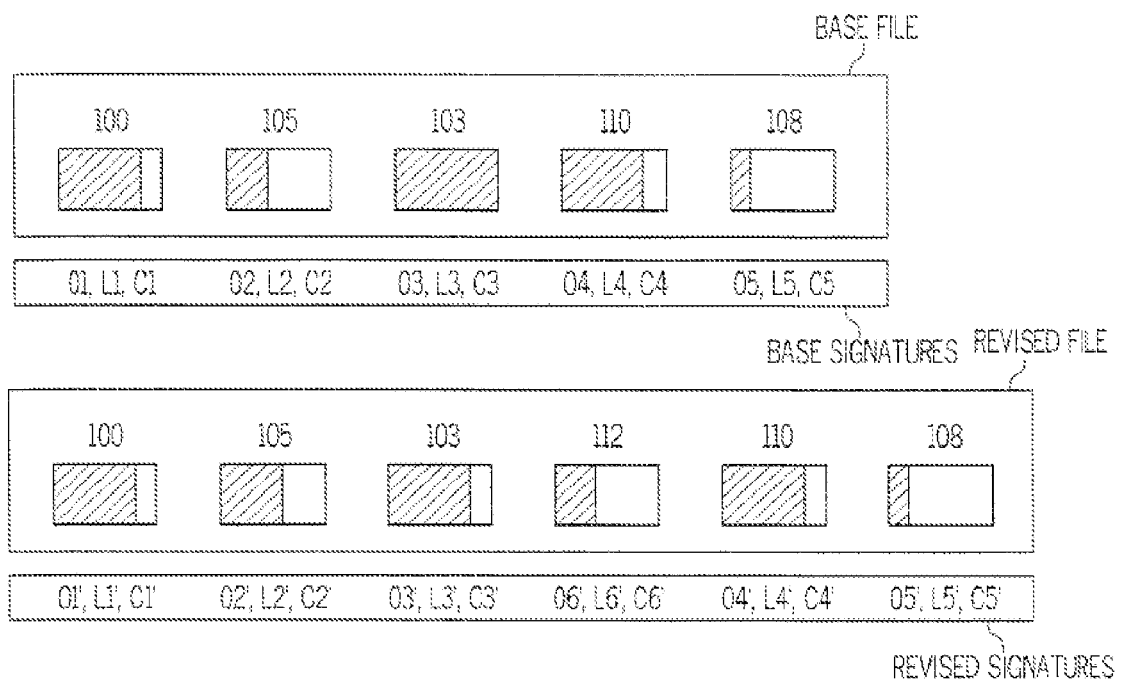
FIG. 8 is a block diagram illustrating an example of the physical blocks of a base file and a revised file, and examples of the signatures that may be utilized with each physical block according to principles of the present invention.

FIG. 8 is a block diagram illustrating an example of the physical blocks of a base file and a revised file, and the signatures that may be associated with each physical block according to such principles. The rectangles represent physical blocks on the disk and the shaded portion of each rectangle represents the portion of valid data on these blocks. The numbers on top of the blocks represent physical addresses and the three values below each block represent the offset, valid data length, and CRC of the valid data within that block. These values can reside in a signature file or other suitable location. The shaded portions of blocks in the order left to right represent the logical data of the file, while the physical addresses of these blocks on the storage medium may be in any order.

As can be seen from FIG. 8, in the revised file, blocks at physical addresses 100, 110 and 108 have remained unchanged while blocks 105 and 103 have changed. Block 112 is a new block added indicating that some data was inserted at that logical location.

In one embodiment using these principles of the invention, processing of the revised file begins by accessing its physical-logical map and determining the length L1 of the valid data on the first physical block of that file, if this length matches with L1 (which in this example it does), the method proceeds to compute the CRC C1' for that block of the revised file and compare it with the CRC of CI for the first block of the base file. If C1' also matches for that block, it would be known that the first block remained unchanged and no command would be entered into the corresponding delta file. If L1' was not the same as L1, the remainder of the base signature file could be searched for L1" traveling in logical order from physical block to physical block of the file. In particular, L1' would be compared to L2, L3, etc. If a match for L1' is found again, a comparison is then made of the corresponding CRC's, to determine if the data contents are also the same, and, if so, the corresponding delta file would include commands reflecting the difference in physical blocks prior to finding the match.

In addition, after processing the first block of the revised file, the process would again search for a match for the length L2' of the second block. This search for a match in the base signature file can start from the last match that occurred and not from the starting of the base signature file. In the example of FIG. 8, L2' does not match any entry in base signature file (i.e., this physical block in the revised file does not have the same length of any previous physical block in the file before it was revised). Therefore, it is known that either the block was inserted or modified. In any case, the block can be treated as a new block. Similarly proceeding, no matches are detected for L3' and L6'. Even if there was a false length match (for example if two dissimilar blocks were both full), the CRC mismatch would ensure that an erroneous match is not indicated. For the next block of length U' however, there is a match both for length and CRC's, C4'=C4. Therefore, the blocks at addresses 105 and 103 of the base file can be treated as having been deleted from the base file and new blocks 105, 103 and 112 of the revised file as having been inserted into the revised file. These deletions and insertions can therefore be conducted at the logical level and can be specified in terms of how many physical blocks are to be deleted or added and at what locations within the logical order of the physical blocks.

Accordingly, in this example, the delete primitive in the final delta file could be specified as:
DEL: offset=O1+L1, length=L2+L3
(to thereby indicate that the after the first physical block (100) of the base file, the next two blocks (105 and 103) are deleted from the base file.)

The insertion primitive for this example could be specified as:
INS: offset=O1+L1, length=L2'+L3'+L6', string=(Data of blocks 2, 3 and 4 of the revised file)
(to indicate that after the first physical block (100) in the base file, the valid data of the second, third, and fourth physical blocks (105, 103, and 112) of the revised file is to be inserted)

After block 5 (110) of the revised file, block 6 (108) also has a match (to block 108) in the base signature file since L5'=L5 and C5'=C5.

Thus, in this method the revised file is processed in the logical order of the physical blocks of the file, and the lengths of these physical blocks are known. Thus, by using the valid data lengths as initial identifiers of the blocks or as low resolution basic signatures, there is not a need to shift any frame of reference by small amounts, or to compute any unnecessary complex signatures for such shifted frames as described, in the earlier alternative embodiments. Rather, the lengths can be compared because this information is known. Also, the primitive commands generated are provided in terms of the logical ordering of physical blocks, rather than on a selected equal block division of the file.

As with the other embodiments described herein, various alternatives to this embodiment are also possible. For example, as one alternative to this embodiment, a threshold value can be provided for the maximum allowable number of un-matched physical blocks. If this value is reached, then the process could be terminated before completion of processing of all physical blocks of the revised file, and, instead of completing and transmitting a delta file, the revised file could be transmitted.

The foregoing description of the illustrative embodiments has been presented for purposes of illustration and description of the various principles of the inventions. It is not intended to be exhaustive or to limit the inventions to the precise forms disclosed, and modifications and variations are possible in light of the above teachings. For example, although a number of methods, systems, operations, and configurations have been described for use in the illustrative embodiments, it is to be understood that additional or alternative methods, systems, operations and configurations could be used without departing from the scope of the inventions. Moreover, although various aspects of the inventions have been illustrated, these aspects need not be utilized in combination.

Therefore, it should be understood that the embodiments were chosen and described in order to best illustrate the principles of the inventions and some examples of possible practical applications. This illustration was also provided to thereby enable one of ordinary skill in the art to utilize the inventions in various embodiments and with various modifications as are suited for the particular use contemplated. Accordingly, it is intended that the scope of the inventions be defined by the claims appended hereto.

What is claimed is:

1. A system for performing file store synchronization across multiple servers, comprising:
    a processor; and
    a memory coupled with and readable by the processor and storing therein a set of instructions which, when executed by the processor, causes the processor to initiate a file store synchronization process by:
        receiving a first file from a first computer server, the first file comprising a plurality of physical blocks of data located at various allocated positions on a memory device of the first computer server;
        receiving a second file from a second computer server, the second file comprising a second plurality of physical blocks of data located at various allocated positions on the memory device of the second computer server;
        performing, in logical order for each particular physical block of the first plurality of the physical blocks of the first file:
            (a) determining a first signature parameter for the particular physical block of the first file by retrieving a predetermined number of bits from a predetermined location within the particular physical block of the first file, wherein the first signature parameter for the particular physical block of the first file is determined based upon a subset of the data within the particular physical block that is less than all of the data in the particular physical block;
            (b) determining a first signature parameter for a corresponding physical block of the second file by retrieving the same predetermined number of bits from the same predetermined location within the corresponding physical block of the second file, wherein the first signature parameter for the corresponding physical block of the second file is determined based upon a subset of the data within the corresponding physical block that is less than all of the data in the corresponding physical block;
            (c) determining whether the retrieved bits comprising the first signature parameter for the particular physical block of the first file match the retrieved bits comprising the first signature parameter for the corresponding physical block of the second file; and
            (d) in response to determining that the first signature parameter for the particular physical block of the first file matches the first signature parameter of the corresponding physical block of the second file, performing the following additional steps for the particular physical block of the first file:
                (i) determining a second signature parameter for the particular physical block of the first file, by executing at least one of a cyclic redundancy check (CRC) algorithm or an MD5 algorithm, using as input all bits of the particular physical block of the first file;
                (ii) determining a second signature parameter for the corresponding physical block of the second file, by executing at least one of a cyclic redundancy check (CRC) algorithm or an MD5 algorithm, using as input all bits of the corresponding physical block of the second file;
                (iii) determining whether the second signature parameter comprising the output of the one or more algorithms for the particular physical block of the first file matches the second signature parameter comprising the output of the one or more algorithms for the corresponding physical block of the second file; and
                (iv) in response to determining that the second signature parameter of the particular physical block of the first file matches the second signature parameter of the corresponding physical block of the second file, creating a delta file using the second signature parameters of the at least one physical block of the second file by generating primitive commands and corresponding logical data parameters for the primitive commands, wherein the logical data parameters comprise logical offset addresses for the base file and logical data lengths for the base file; and
        initiating a file store synchronization process between the first computer server and the second computer server, using the delta file as input to the file store synchronization process.

2. The system as recited in claim 1, wherein the second signature parameter for each physical block of the first file comprises an amount of valid data within the associated physical block.

3. The system as recited in claim 1, wherein the second signature parameter for each physical block of the first file comprises a cyclic redundancy check value residing in a signature file.

4. The system of claim 1, wherein the first signature parameter of the first file and the first signature parameter of the second file comprise coarse signature values.

5. The system of claim 4, wherein the second signature parameter of the first file and the second signature parameter of the second file comprise fine signature values.

6. The system of claim 5, the instructions, when executed by the processor, further causing the processor to perform comparing in logical order of the physical blocks of the first file a first signature parameter for each of these physical blocks of the first file to a first signature parameter of at least one physical block of the second file, by moving a reference frame from a first physical block to a second or subsequent physical block until a match is found between the first signature parameter of at least one physical block of the first file and the first signature parameter of the at least one physical block of the second file.

7. The system of claim 6, the instructions, when executed by the processor, further causing the processor to perform comparing a second signature parameter for each of these physical blocks of the first file to a second signature parameter of at least one physical block of the second file, by moving a reference frame from a first location in a physical block to a second or subsequent location in a physical block until a match is found between the second signature parameter of at least one physical block of the first file and the second signature parameter of the at least one physical block of the second file.

8. A computer-readable memory device comprising a set of instructions stored therein which, when executed by a processor, causes the processor to perform file store synchronization across multiple servers, by:

receiving a first file from a first computer server, the first file comprising a first plurality of physical blocks of data located at various allocated positions on a memory device of the first computer server;

receiving a second file from a second computer server, the second file comprising a plurality of physical blocks of data located at various allocated positions on the memory device of the second computer server;

performing the following steps for each particular physical block of the first plurality of physical blocks in the first file:

(a) determining a first signature parameter for the particular physical block of the first file by retrieving a predetermined number of bits from a predetermined location within the particular physical block of the first file, wherein the first signature parameter for the particular physical block of the first file is determined based upon a subset of the data within the particular physical block that is less than all of the data in the particular physical block;

(b) determining a first signature parameter for a corresponding physical block of the second file by retrieving the same predetermined number of bits from the same predetermined location within the corresponding physical block of the second file, wherein the first signature parameter for the corresponding physical block of the second file is determined based upon a subset of the data within the corresponding physical block that is less than all of the data in the corresponding physical block of the second file;

(c) determining whether the retrieved bits comprising the first signature parameter for the particular physical block of the first file match the retrieved bits comprising the first signature parameter for the corresponding physical block of the second file; and (d) in response to determining that the first signature parameter for the particular physical block of the first file matches the first signature parameter of the corresponding physical block of the second file, performing the following additional steps for the particular physical block of the first file:

(i) determining a second signature parameter for the particular physical block of the first file, by executing at least one of a cyclic redundancy check (CRC) algorithm or an MD5 algorithm, using as input all bits of the particular physical block of the first file;

(ii) determining a second signature parameter for the corresponding physical block of the second file, by executing at least one of a cyclic redundancy check (CRC) algorithm or an MD5 algorithm, using as input all bits of the corresponding physical block of the second file;

(iii) determining whether the second signature parameter comprising the output of the one or more algorithms for the particular physical block of the first file matches the second signature parameter comprising the output of the one or more algorithms for the corresponding physical block of the second file; and (iv) in response to determining that the second signature parameter of the particular physical block of the first file matches the second signature parameter of the corresponding physical block of the second file, creating a delta file using the second signature parameters of the at least one physical block of the second file by generating primitive commands and corresponding logical data parameters for the primitive commands, wherein the logical data parameters comprise logical offset addresses for the base file and logical data lengths for the base file; and initiating a file store synchronization process between the first computer server and the second computer server, using the delta file as input to the file store synchronization process.

9. The computer-readable memory device as recited in claim 8, wherein the second signature parameter for each physical block of the first file comprises an amount of valid data within the associated physical block.

10. The computer-readable memory device as recited in claim 8, wherein the second signature parameter for each physical block of the first file comprises a cyclic redundancy check value residing in a signature file.

11. The computer-readable memory device of claim 8, wherein the first signature parameter of the first file and the first signature parameter of the second file comprise coarse signature values.

12. The computer-readable memory device of claim 11, wherein the second signature parameter of the first file and the second signature parameter of the second file comprise fine signature values.

13. The computer-readable memory device of claim 12, wherein the instructions, when executed by the processor, further cause the processor to compare the first signature parameter for each of the particular physical blocks of the first file to the first signature parameter of the corresponding physical block of the second file, by moving a reference frame from a first physical block to a second or subsequent physical block until a match is found between the first signature parameter of the particular physical block of the first file and the first signature parameter of a corresponding physical block of the second file.

14. The computer-readable memory device of claim 13, wherein the instructions, when executed by the processor, further cause the processor to compare the second signature parameter for each of the particular physical blocks of the first file to the second signature parameter of the corresponding physical block of the second file, by moving a reference frame from a first location in a physical block to a second or subsequent location in a physical block until a match is found between the second signature parameter of the particular physical block of the first file and the second signature parameter of a corresponding physical block of the second file.

15. A method of performing file store synchronization across multiple servers, the method comprising:

receiving a first file from a first computer server, the first file comprising a first plurality of physical blocks of data located at various allocated positions on a memory device of the first computer server;

receiving a second file from a second computer server, the second file comprising a second plurality of physical blocks of data located at various allocated positions on a memory device of the second computer server;

for each particular physical block of the first plurality of physical blocks in the first file, performing the following steps:

(a) determining a first signature parameter for the particular physical block of the first file by retrieving a predetermined number of bits from a predetermined location within the particular physical block of the first file, wherein the first signature parameter for the particular physical block of the first file is determined based upon a subset of the data within the particular physical block that is less than all of the data in the particular physical block;

(b) determining a first signature parameter for a corresponding physical block of the second file by retrieving the same predetermined number of bits from the same predetermined location within the corresponding physical block of the second file, wherein the first signature parameter for the corresponding physical block of the second file is determined based upon a subset of the data within the corresponding physical block that is less than all of the data in the corresponding physical block of the second file;

(c) determining whether the retrieved bits comprising the first signature parameter for the particular physical block of the first file match the retrieved bits comprising the first signature parameter for the corresponding physical block of the second file; and (d) in response to determining that the first signature parameter for the particular physical block of the first file matches the first signature parameter of the corresponding physical block of the second file, performing the following additional steps for the particular physical block of the first file:

(i) determining a second signature parameter for the particular physical block of the first file, by executing at least one of a cyclic redundancy check (CRC) algorithm or an MD5 algorithm, using as input all bits of the particular physical block of the first file;

(ii) determining a second signature parameter for the corresponding physical block of the second file, by executing at least one of a cyclic redundancy check (CRC) algorithm or an MD5 algorithm, using as input all bits of the corresponding physical block of the second file;

(iii) determining whether the second signature parameter comprising the output of the one or more algorithms for the particular physical block of the first file matches the second signature parameter comprising the output of the one or more algorithms for the corresponding physical block of the second file; and (iv) in response to determining that the second signature parameter of the particular physical block of the first file matches the second signature parameter of the corresponding physical block of the second file, creating a delta file using the second signature parameters of the at least one physical block of the second file by generating primitive commands and corresponding logical data parameters for the primitive commands, wherein the logical data parameters comprise logical offset addresses for the base file and logical data lengths for the base file; and initiating a file store synchronization process between the first computer server and the second computer server, using the delta file as input to the file store synchronization process.

16. The method of claim 15, wherein the first signature parameter of the first file and the first signature parameter of the second file comprise coarse signature values.

17. The method of claim 16, wherein the second signature parameter of the first file and the second signature parameter of the second file comprise fine signature values.

18. The method of claim 17, further comprising comparing the first signature parameter for each of the particular physical blocks of the first file to the first signature parameter of the corresponding physical block of the second file, by moving a reference frame from a first physical block to a second or subsequent physical block until a match is found between the first signature parameter of the particular physical block of the first file and the first signature parameter of a corresponding physical block of the second file.

19. The method of claim 18, further comprising comparing the second signature parameter for one or more of the particular physical blocks of the first file to the second signature parameter for the corresponding one or more physical blocks of the second file, by moving a reference frame from a first location in a physical block to a second or subsequent location in a physical block until a match is found between the second signature parameter of the particular physical block of the first file and the second signature parameter of a corresponding physical block of the second file.

* * * * *

UNITED STATES PATENT AND TRADEMARK OFFICE
CERTIFICATE OF CORRECTION

PATENT NO. : 9,934,301 B2  
APPLICATION NO. : 13/633526  
DATED : April 3, 2018  
INVENTOR(S) : Srivastava et al.

Page 1 of 2

It is certified that error appears in the above-identified patent and that said Letters Patent is hereby corrected as shown below:

On the Title Page

Item (57), under Abstract, Line 5, delete "block," and insert -- block --, therefor.

In the Specification

In Column 1, Line 12, delete "11,891,692," and insert -- 11/891,962, --, therefor.

In Column 2, Line 60, delete "computation ally" and insert -- computationally --, therefor.

In Column 5, Line 54, delete "amore" and insert -- a more --, therefor.

In Column 6, Line 10, delete "invention, in" and insert -- invention. In --, therefor.

In Column 10, Line 57, delete "file, if" and insert -- file. If --, therefor.

In Column 11, Line 61, delete "block," and insert -- block --, therefor.

In Column 14, Line 7, delete "hits)." and insert -- bits). --, therefor.

In Column 16, Line 6, delete "$CRC_{om}.$" and insert -- $CRC_{old}.$ --, therefor.

In Column 17, Line 11, delete "Substring" and insert -- SubString --, therefor.

In Column 17, Line 17, delete "0" and insert -- '0' --, therefor.

In Column 17, Line 34, delete "length(for" and insert -- length (for --, therefor.

In Column 18, Line 45, delete "$P_T$" and insert -- $P_T$, --, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,934,301 B2

In Column 18, Line 49, delete "did" and insert -- end --, therefor.

In Column 21, Line 52, delete "file, if" and insert -- file. If --, therefor.

In Column 22, Line 49, delete "described," and insert -- described --, therefor.